(12) United States Patent
Skepton

(10) Patent No.: US 10,194,723 B2
(45) Date of Patent: Feb. 5, 2019

(54) COMPOSTABLE COMPOSITE MULTIPANEL SMARTPHONE, TABLET AND MOBILE ELECTRONIC DEVICE COVER KITS FOR CONSUMER PRINT PERSONALIZATION AND STRUCTURAL CUSTOMIZATION

(71) Applicant: Cynthia Lisa Skepton, Banks, OR (US)

(72) Inventor: Cynthia Lisa Skepton, Banks, OR (US)

(73) Assignee: Cynthia Lisa Skepton, Banks, OR (US)

( * ) Notice: Subject to any disclaimer, the term of this patent is extended or adjusted under 35 U.S.C. 154(b) by 809 days.

(21) Appl. No.: 14/540,010

(22) Filed: Nov. 12, 2014

(65) Prior Publication Data

US 2015/0151515 A1     Jun. 4, 2015

Related U.S. Application Data

(60) Provisional application No. 61/903,385, filed on Nov. 12, 2013.

(51) Int. Cl.
*B32B 7/00* (2006.01)
*A45C 11/00* (2006.01)
(Continued)

(52) U.S. Cl.
CPC .............. *A45C 11/00* (2013.01); *A45C 3/001* (2013.01); *B32B 7/06* (2013.01); *B32B 7/12* (2013.01); *B32B 27/12* (2013.01); *G06F 1/1628* (2013.01); *H04B 1/3888* (2013.01); *A45C 2011/001* (2013.01); *A45C 2011/002* (2013.01); *A45C 2011/003* (2013.01); *B32B 2260/021* (2013.01); *B32B 2260/046* (2013.01); *B32B 2262/062* (2013.01); *B32B 2307/7163* (2013.01); *B32B 2307/75* (2013.01); *B32B 2457/00* (2013.01); *H04M 1/0283* (2013.01);
(Continued)

(58) Field of Classification Search
CPC . G06F 3/041; G06F 2203/04107; B32B 7/12; B32B 7/00; B32B 17/064
USPC ............................................ 428/98; 206/320
See application file for complete search history.

(56) References Cited

U.S. PATENT DOCUMENTS

| | | | |
|---|---|---|---|
| 2008/0121541 A1* | 5/2008 | Clark | H01H 9/0242 206/320 |
| 2013/0033808 A1* | 2/2013 | Cohen | B29C 63/0047 361/679.01 |
| 2013/0209718 A1* | 8/2013 | Wen | C09J 7/0296 428/40.2 |

* cited by examiner

*Primary Examiner* — King M Chu

(57) ABSTRACT

Disclosed is DIY consumer kit for making print personalized, structurally customized covers and cases used to protect mobile electronic devices. In all embodiments, covers and cases use an encapsulated bio-based compostable resin composite fused with external layers of organic carbon neutral reclaimed industrial fiber, this composite provides an inkjet receptive sheet that may be fed through any printer for consumer customization. These composites in sheet or roll form may be scored, laser cut and micro-cut for all flat electronic devices to facilitate folding into a 3D form. Once printed, consumers may fold the 2D composite sheet, attach pre-cut layered adhesives, nano suction attachment pads and attachment clear plates for device placement on the interchangeable covers or cases. Nano rubber polymer suction pads provide locking cover attachment, attachment of the electronic device to other surfaces and enable angled viewing when the covers are folded in a stand configuration.

13 Claims, 15 Drawing Sheets

(51) Int. Cl.
*B32B 7/06* (2006.01)
*B32B 7/12* (2006.01)
*B32B 27/12* (2006.01)
*A45C 3/00* (2006.01)
*G06F 1/16* (2006.01)
*H04B 1/3888* (2015.01)
*H04M 1/02* (2006.01)
*H04M 1/18* (2006.01)

(52) U.S. Cl.
CPC ............ *H04M 1/185* (2013.01); *Y10T 428/15* (2015.01); *Y10T 428/2848* (2015.01); *Y10T 428/31826* (2015.04)

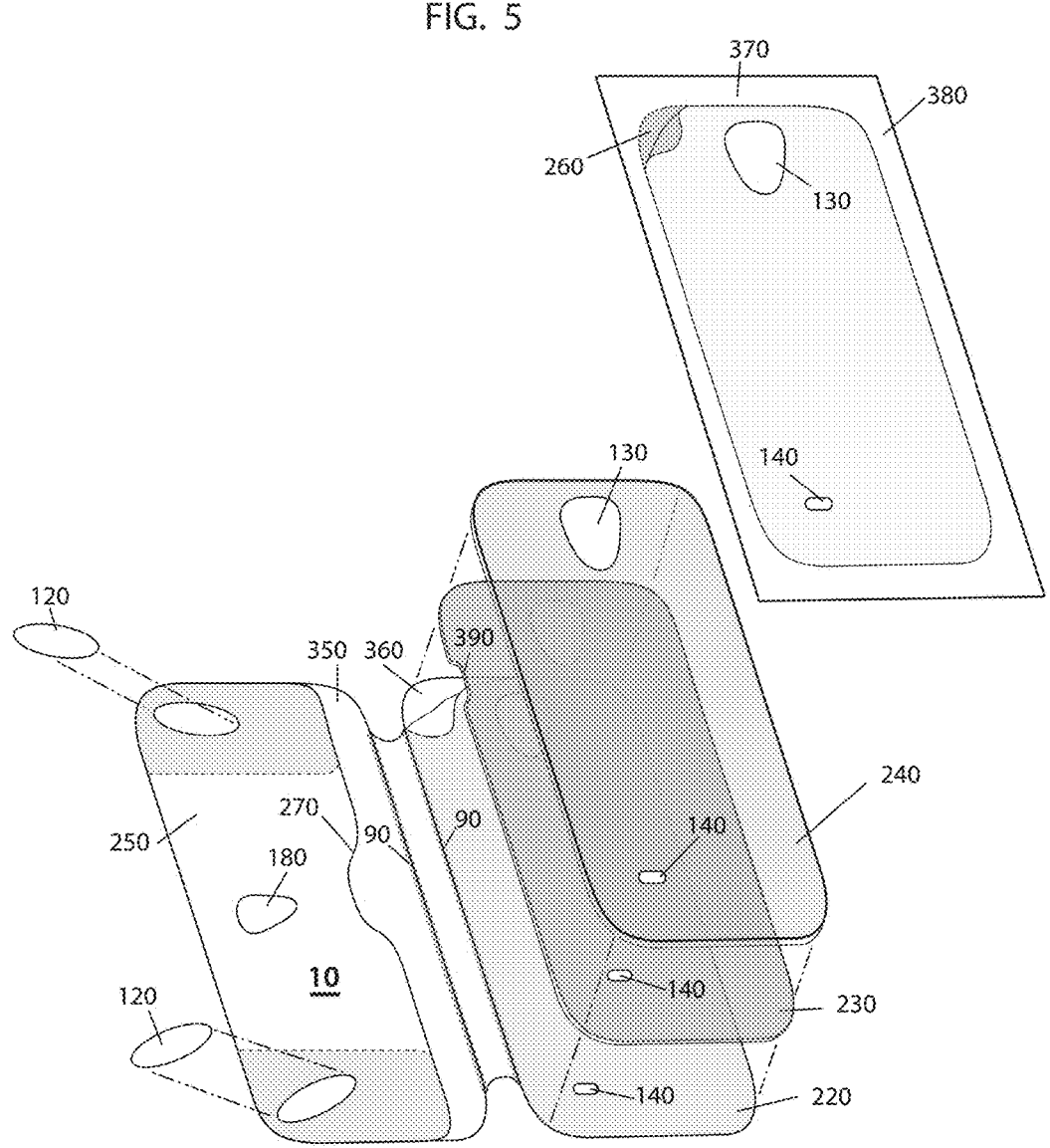

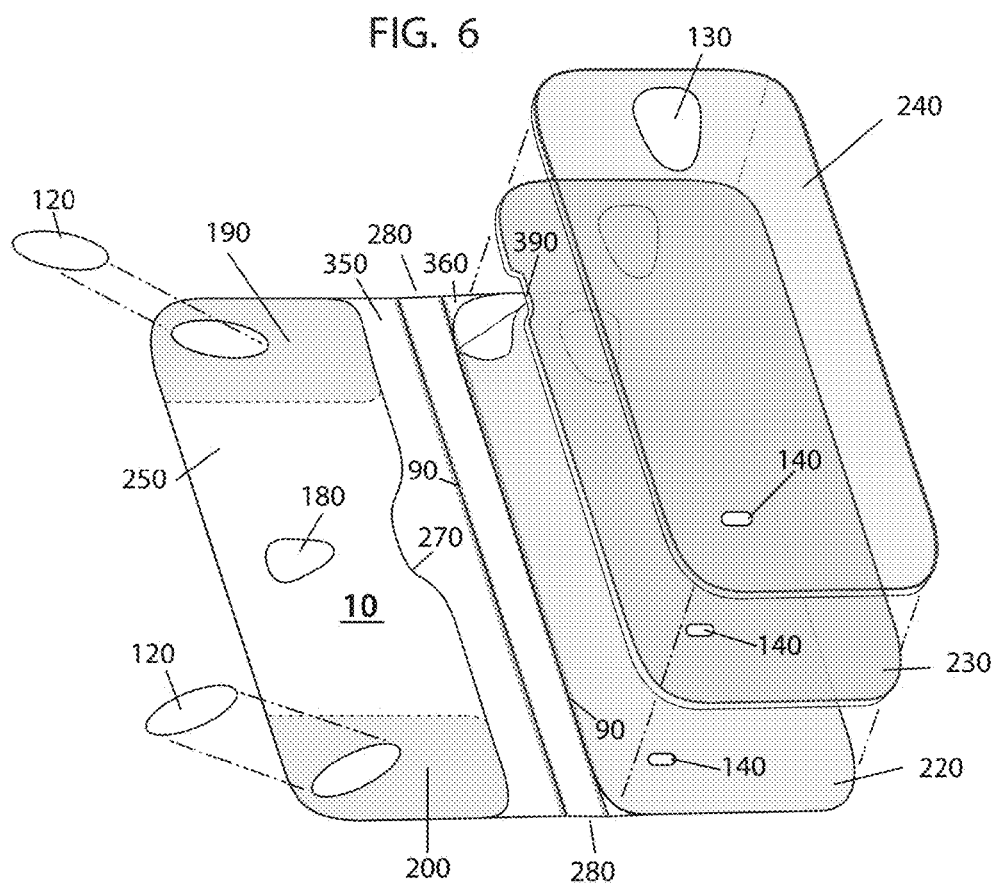

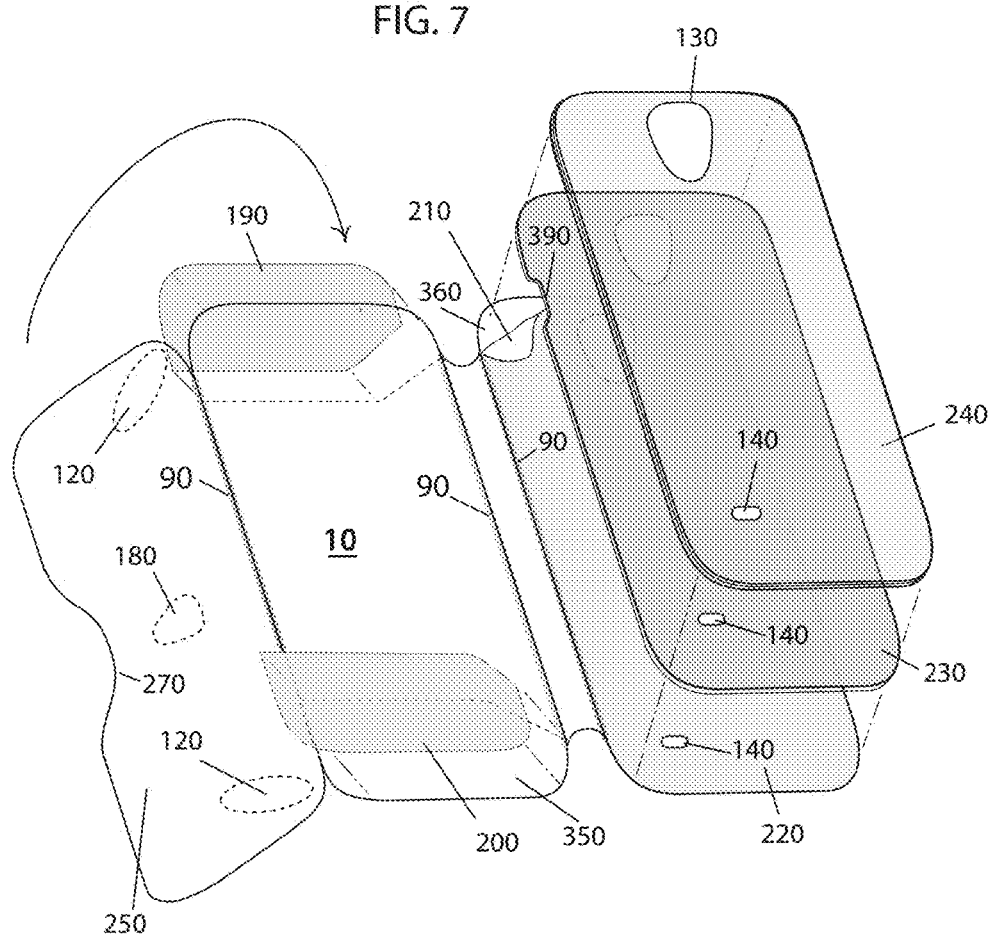

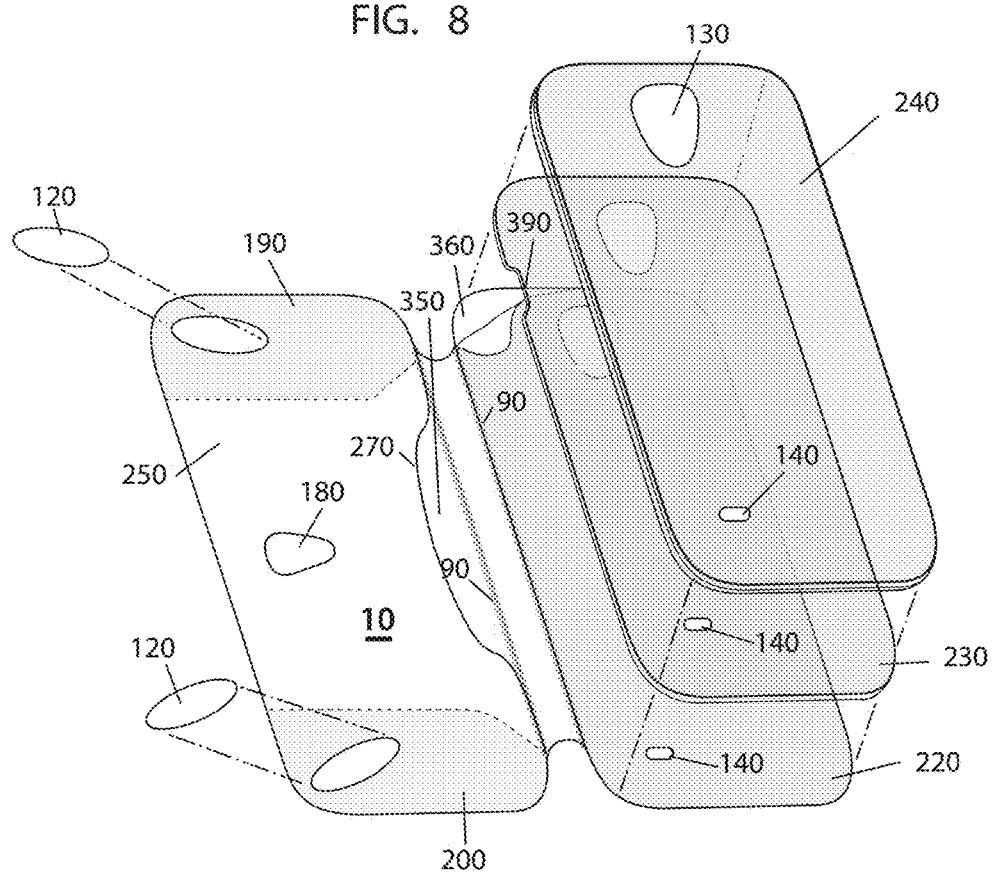

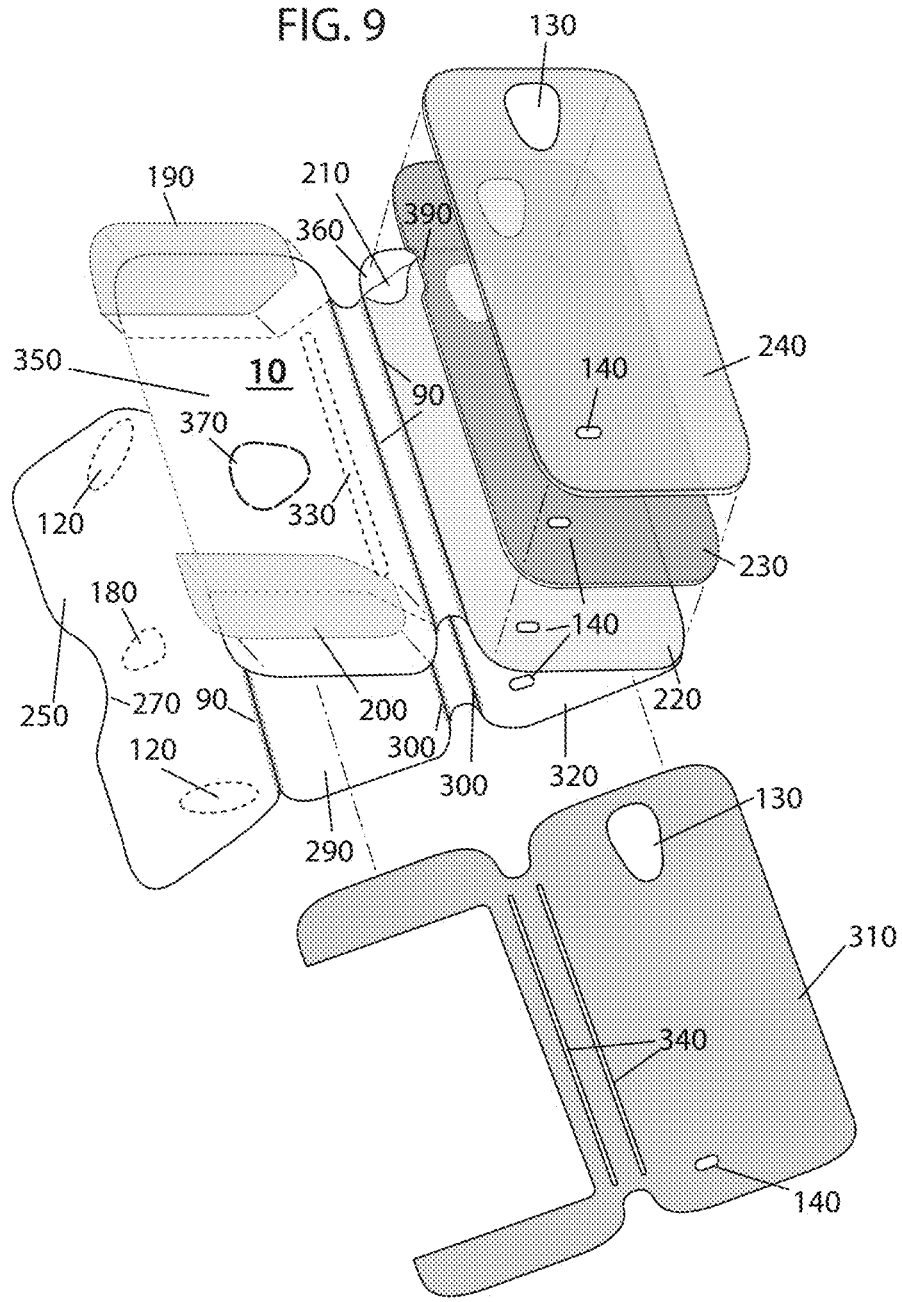

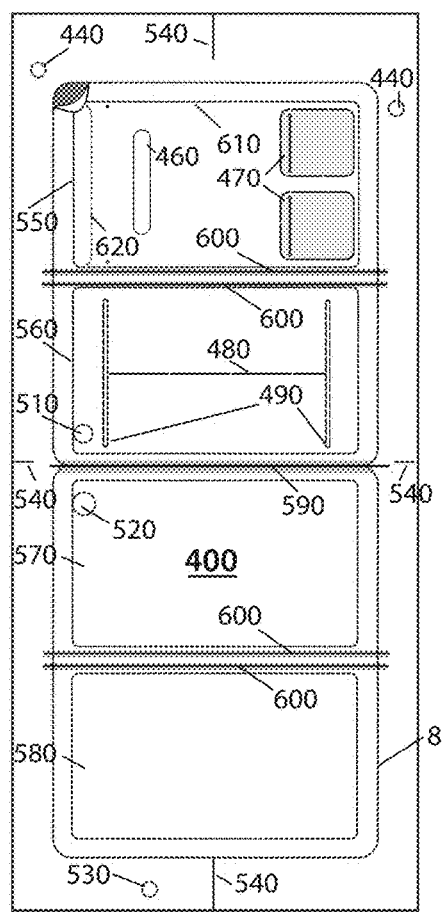
FIG. 10-A
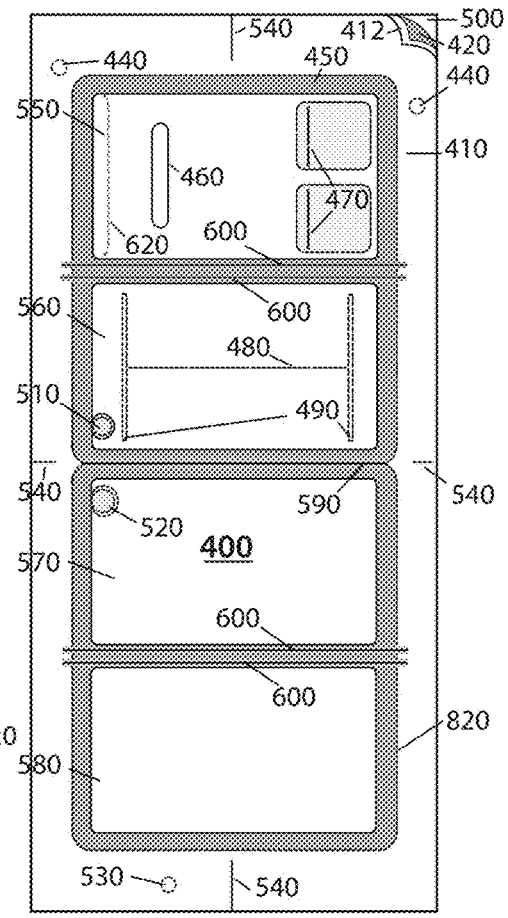
FIG. 10-B
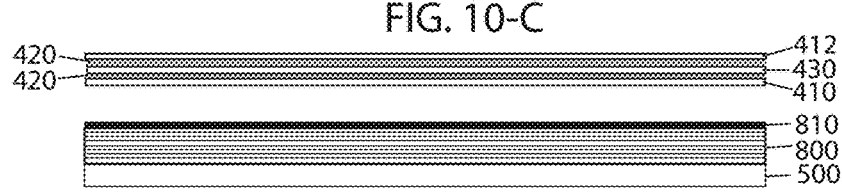
FIG. 10-C

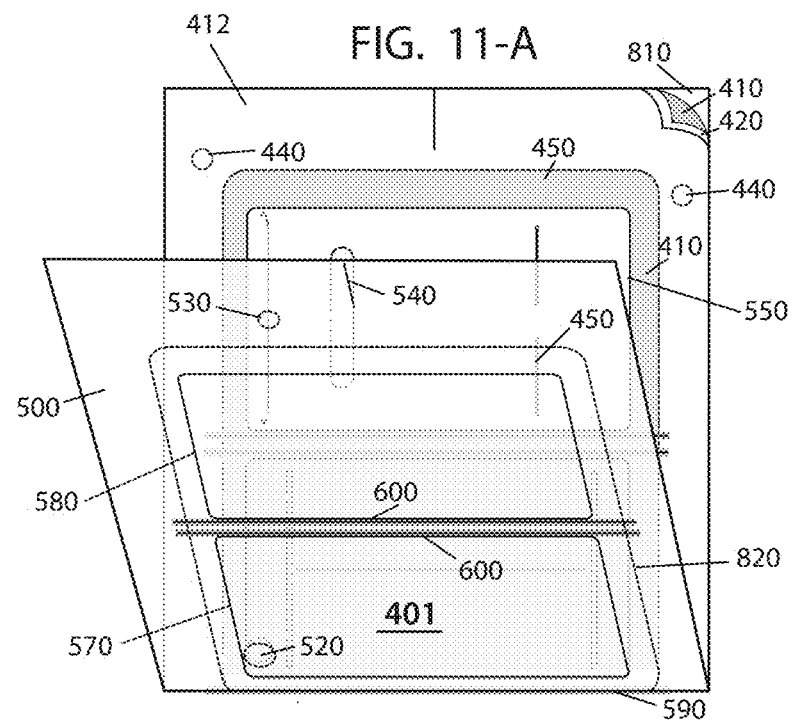
FIG. 11-A
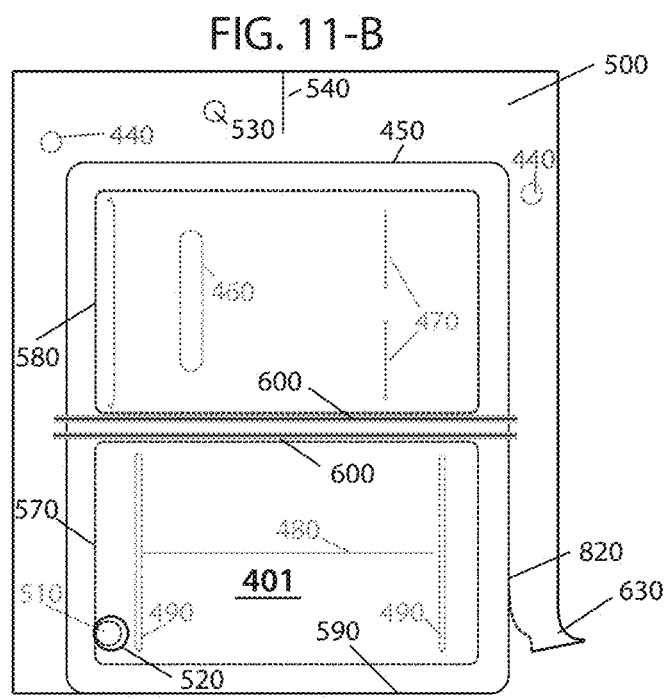
FIG. 11-B

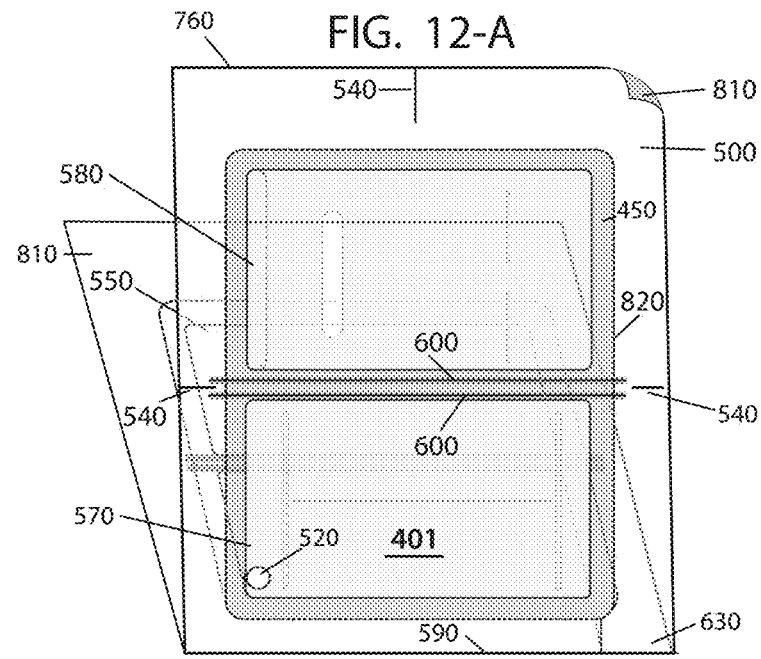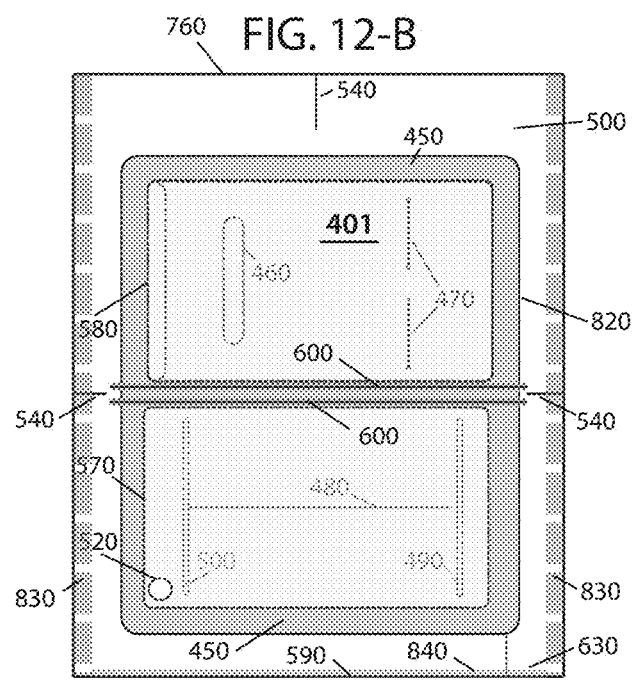

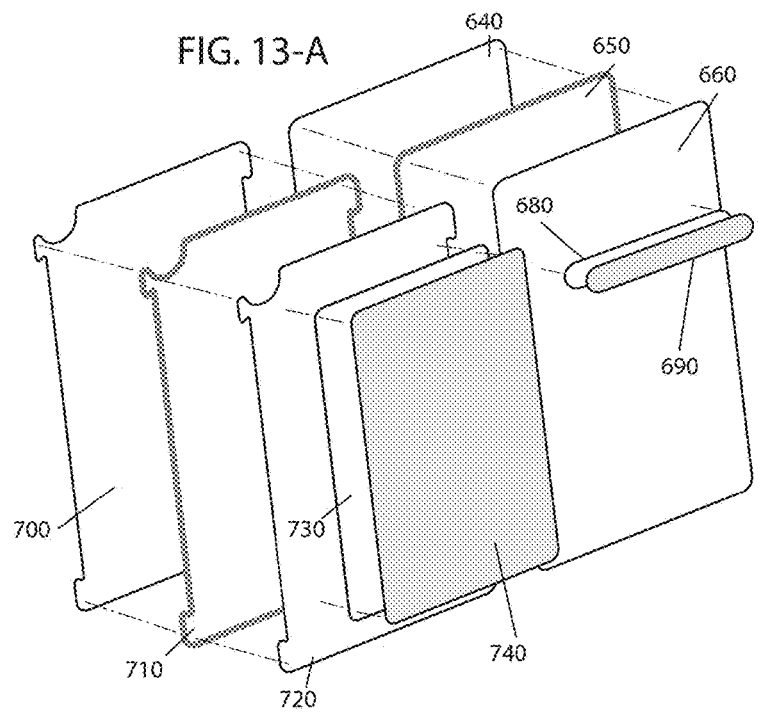
FIG. 13-A
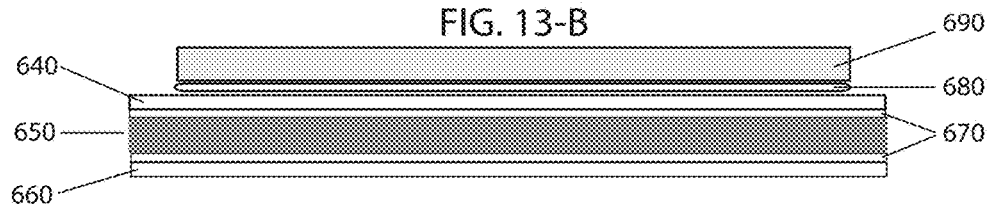
FIG. 13-B
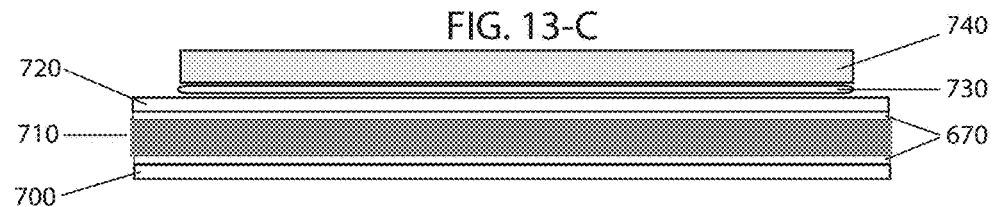
FIG. 13-C

COMPOSTABLE COMPOSITE MULTIPANEL SMARTPHONE, TABLET AND MOBILE ELECTRONIC DEVICE COVER KITS FOR CONSUMER PRINT PERSONALIZATION AND STRUCTURAL CUSTOMIZATION

CROSS-REFERENCES TO RELATED APPLICATIONS

This application is a continuation-in-part of Provisional application No. 61/903,385, filed on Nov. 12, 2013 by Cynthia L. Skepton. Applicant is claiming benefit and priority of the earlier Provisional filing date.

STATEMENT REGARDING FEDERALLY SPONSORED RESEARCH OR DEVELOPMENT

Not Applicable.

FIELD OF THE INVENTION

The present invention is directed to the print and structure customizable, multi-panel, die cut covers and case kits for all mobile electronic flat devices including smartphones, iPods™, iPads™, phablets, e-readers, hybrid laptops, and tablets. Manufactured with environmentally friendly composite materials encompassing a unique unobstructed device attachment system, these protective covers and cases are easily printed, customized and converted by the consumer at home using an ordinary desktop inkjet printer or any other means of applying additive color to the ink receptive fiber surfaces.

BACKGROUND OF THE INVENTION

As mobile tablets, smartphone, e-readers and phablets gain in popularity over traditional laptops and desktop computers, consumers in search of a personalized covers to protect and enhance their own mobile experience have minimal choices in the market place. One can find a plethora of conventional plastics cases, primarily single substrate cases manufactured in base colors and other marked down sleeves in the wildest of colors in non-environmentally friendly neoprene, PVC, rubber, silicone polymers or plastic. Typical base colors are found in black, blue, red, grey and white in hand stitched products and one piece clip-on shells. Color customization of these shells and stitched covers is limited to those companies offering the additive application of UV ink on the exterior side in less than full bleed color and typically on one side. Customizers, those online companies who sell the service of printing the additive color on mobile device cases and covers apply UV inks or use a vacuum and heat process to transfer ink from image sheets directly to substrates on a variety of plastics, neoprenes, vinyls and other materials. These materials were originally designed to be purchased without color modifications. Exterior substrates on these covers are prone to ink smudging as the substrate surface is a polymer based smooth surface that is minimally ink receptive. While UV ink printers preform the task of placing color on the plastic exterior substrates they do so in less than full bleed because the UV print head is limited to flat panels. Transfer sheets may transfer ink around corners as the image sheet is vacuum bagged around the device and heated but quality is less than printing direct to a ink receptive surface. UV ink form factor printers and transfer ink systems are more expensive to purchase and require additional labor and training for image alignment when compared to the common ink jet printers or color laser printers. Customization adds additional labor, shipping and cover product mark-ups, these are passed onto the online and retail consumer. Other options for personalization besides hand painting include laser etching, full panel die cut sheets and pre-cut adhesive labels that are already printed, all of which are applied to existing covers and cases not designed for end-user customization or print personalization.

Structures used in larger electronic device covers, manufactured in high volume are made with predetermined sewn pockets and lack the ability for customization of the structure materials, pockets or attachment elements. Although tablets and smartphones are manufactured in large quantities virtually using the same exterior shape or form factor, their use is varied for the individual consumer. Not all tablets are used for the same purpose or task. Inserts that cushion the tablets or e-reader inside covers are typically inexpensive, low density foam die cut shapes with camera, ports and connection areas that are precut. Foam inserts found in the shells, covers and cases are not typically environmentally friendly or easily modified by the consumer. Inserts when subjected to higher heat found in vehicles often distort and the foam loses its shape, eventually the insert falls apart or becomes compressed in a short time causing slippage or accidental ejection of the electronic device. Straps placed in the corners of the tablet covers/cases to hold tablets in place on inside cover face tend to stretch over time from the constant shifting while in transport and eventually break. Often these straps or restraints obstruct handling or the screen view when gripping the tablet during use and offer minimal protection at the edges and corners of the tablet or e-reader where glass meets the case bezel. Other tablet covers made with die cut materials are hand sewn together, often fit poorly, limiting or obstructing the camera aperture or causing premature wear at connection ports caused by misalignment of the cover to the tablet or e-reader. While sales are projected to climb above 550 million new units in 2014 in all sizes of smartphones, tablets and e-readers, not one cover or case is made to be print personalized or structurally customized off the retail shelf at home using an inkjet printer, color laser printer or UV printer.

There is a need for a new type of electronic device cover or case kit manufactured for the "Do-It-Yourself" consumer who has access to a desktop printer, color laser printer and desires the look they couldn't find off the retail store shelf. As such, these covers and cases have desirable characteristics and features while also offering full bleed color personalization, encompassing protection, better printing than plastic, reusable attachment pads for unobstructed device attachment to cover or case. Using stronger more flexible composites would provide a more flexible, resilient structure that resists cracking or chipping found in single substrates. Additionally, a design that provides multiple die cut adaptive configurations so the end user may tailor the covers or cases to specific use or tasks. Having the ability to take a common, ordinary looking device and rebranded it as to look like your own, appeals to tweens and young adults as they begin to receive handed-me-down tablets and e-readers from parents. Lastly, using lighter, reclaimed-recycled materials found in compostable, eco-composites manufactured with roll-to-roll processes, would result in quicker production cycles for incremental electronic device new product launches and lower cost benefiting both consumer and the environment.

SUMMARY OF THE INVENTION

The present embodiments provide an environmentally friendly, flexible composite structure converted into a universal encompassing, protective crack resistant cover or case that may be print personalized and customized easily as a kit built for the consumer for all flat electronic device form factors. These cover and case embodiments with their form factor variations for both smartphones and the larger form factors such as tablets, e-readers are slightly different, as is their everyday use but the core materials and the developer goal is the same. Similarities in shape, composite materials, device attachment, manufacturing, folding and sealing are all centric to the embodiments of a customizable, print personalized cover or case designed for the retail consumer who seeks a unique, adaptable product with numerous advantages and benefits. Although designed for DIY consumer customization, all covers and cases may as well be pre-printed, colorized for retail sale as an eco-cover or printed for resale by customizers as the covers may be manufactured in roll stock form for continuous high-end resolution inkjet printing.

In preferred aspects, the present embodiments provide a novel composite that is over 50% carbon neutral in total content as a finished product, extremely resilient, receptive to inkjet and color laser type printers as tested using multiple versions of consumer based printers made by Epson™ Canon™ and HP™. The carbon neutral, reclaimed tactile fiber substrate used in the exterior layers of the composite structure is water resistant, smudge resistant when exposed to alcohol based hand cleaner gel residue, acid free and minimally processed. This fiber substrate sheet material is fused to both sides of a flexible plastic composite providing a unique, flexible structure that is manufactured to be thin enough to print through curved print path yet strong enough for everyday use and handling. The composite structure encompasses the smartphone by folding multiple die cut or laser cut, scored, micro-cut panels once the sheet form is print personalized. These panels are removed post print as a contiguous die cut group from their printed host sheet. These panels form a flexible base for attachment of multiple panels that when folded, forming a pocket by using a die cut 2-sided, permanent adhesive plates between the layers to seal the fold. Nano suction thermoplastic rubber polymer die cut buttons for the front glass cover closure system are applied to the folded and fused pocket panel on the inside front cover and a crystal clear smooth plate is adhered with permanent clear adhesive to mount the reattachable two-sided Nano thermoplastic rubber polymer suction die cut device pad to the inside back cover. Larger 4-panel device units may be pre-sealed, die cut and micro-cut as a 4-panel cover within the folded and sealed host sheet using a flat multi-layer, configuration prior to print, similar to smartphones. Other options related to the embodiments of the larger device cases may include the need for sealing the structure after printing using a die cut, micro-cut and mirrored adhesive sealing sheet aligned to the plastic side of the layout tablet printer sheet. This tablet-phablet cover embodiment may be sealed post print once removal of a micro-cut release liner is preformed exposing an adhesive self-sealing layer. The cover may then be folded in half on the horizontal score placed between the two middle mirrored panels that is parallel with the fiber substrate grain. Larger covers and cases use composite inserts that are fused with internal felt or wool cushions providing shock protection and a smooth mounting plate for the one or two-sided Nano suction thermoplastic rubber polymer attachment pads. All covers, cases and inserts utilize a die cut, one or two-sided Nano suction thermoplastic rubber polymer attachment pads for unobstructed use of the electronic device, secure attachment of the device to the cover as it seals and locks to both covers securely when closed. This Nano suction thermoplastic rubber polymer suction attachment pad also allows for device reattachment to other smooth surfaces, reattachment to the cover at any angle using the mounting insert and offers instant cover interchangeability. The only alignment necessary when attaching the device to the cover is the alignment of the flash and camera lens to the holes located on bottom side of tablets and smartphones. Front cover and back cover Nano thermoplastic rubber polymer suction attachment pads also provide the attachment base for a variable stand limiter if the cover unit is inverted and converted to an A-frame stand. Smartphone covers may also be used as a stand if a length of film or paper is anchored to each of the Nano thermoplastic rubber polymer suction attachment pads. Consumers may omit the use of a die cut ports by not removing the micro-cut opening or may add additional ports or pockets using a layout digital template to place printed cut lines in a layout program prior to printing the 4/color build. Additional cuts may be made to printed guide lines on the interior or exterior structural layers using an exacto knife with a chip board cutting plate separating interior and exterior layers.

Advantages

Advantages in addition to print customization, structural modification to existing pocket configurations and die cut port configurations are numerous in the embodiment of the cases and covers. As such, as all composite materials are either biodegradable and/or compostable to ASTM D6400 standards using certified composting landfills. Resins used in the composites are odorless and encapsulated between fiber layers. The reusable electronic device attachment system and cover closure are designed for up to 2,000 device attachment cycles and securely lock all devices into their custom cut cover or case. Covers are instantly interchangeable, crack resistant and minimize environmental impact by using a minimal structure that is made with fully biodegradable materials. Composite materials also decay in less than 180 days leaving only water and $CO_2$ in landfills. These materials are the consumable element, Nano suction pads and buttons are the reusable element. Consumers may purchase additional cover kits with buttons at a lower cost without the Nano device attachment pad and interchange covers with new ones as they desire. Double sided, die cut Nano thermoplastic rubber polymer suction attachment pads provide unobstructed device use, offer better sound capabilities and allow for the reattachment of the device to other nonporous surfaces with the pad for viewing at any angle. These pads may also be converted into a stand for extended viewing of the device at any angle using a simple strip of paper or plastic as a limiter placed between both panel Nano suction pads. These Nano thermoplastic rubber polymer suction attachment pads also protect the device along with the natural or reclaimed flexible cushion inserts in the larger devices. Custom made compressed fiber exterior substrates used in all covers and cases are made with a brightness of 96 in bright white so consumers may reproduce digital images with a greater range of tonal values. Smartphone covers may printed on both sides using roll fed printers or Epsons™, this will save handling and labor during customization in volume. Sheeted covers for Smartphones may be printed through a commercial color laser photo printer at 20 per minute with photo color fused to both sides of the fiber exterior at 2400×2400 dpi. Covers and cases are manufactured with 50% or greater total carbon neutral content and 50% or greater reclaimed recycled content using industrial scrap materials that are minimally reprocessed. Overall mass is substantially less in terms of manufactured plastic based material content as compared to blown or molded plastic shells, cases and/or covers. Overall manufacturing processes are less time consuming, require 75% less energy and tooling costs are minimal with roll-to-roll processes using agile robotic laser roll stock cutters and web based auto platen letterpress manufacturing. Surfaces of this composite may be made in a variety of tactile, matte or smooth finishes in varied thicknesses for both retail and direct-to-consumer covers and cases. Inserts as well may have different thicknesses and densities for different electronic devices. The composite structure material may be heated or pressed for a more rigidity or left untouched for extended flexibility, this allows for variable structure flexing at pockets and spine with limited flex at the flat pressed, sealed areas of the covers and cases where the unit is sealed at the face, foot and head of the opened cover. Additional laser, heated and mechanical compression scoring allows for hinged movement of the covers and the ability to enhance shape while still offering a flat print surface capable of easily accepting ink and/or pigmented solutions either by electrostatic charge, spray, inkjet head, paint, watercolor paints, oil based paints, rolled film emulsion transfer, conventional printing and 3-D printer forms or builds to the surface. Repressing and heating the covers with an ordinary home clothes iron for additional sealing post-press provides the ability to modify pockets or seal areas if modification is desired. Although the covers and case are designed to be built to one specific smartphone, tablet or e-reader model per set of die-cut folded forms, covers and cases may be graphically and physically changed by the consumer to meet the desires of the consumers imagination and creative mind for modification unlike currently available covers and cases in the retail and online market space. Retailers have multiple benefits selling white blank pre-print covers with reduced number of skus, fewer returns of unwanted pre-colored cases and the kits may be inexpensively mailed in an envelope easily to the online consumer.

Additional advantages of the invention are set forth in the following description which follows, and in part will be obvious from the description, or may be realized and learned by practice of the invention. Multiple advantages of the invention may be realized and achieved by means of instrumentalities and combinations particularly pointed out in the following description and drawings. Further benefits and advantages of the embodiments of the invention will become evident and clear through the consideration of the following detailed explanation of with reference to the accompanying drawings, which show specificities of preferred embodiments of the present invention.

BRIEF DESCRIPTION OF DRAWINGS

The accompanying drawings, which are incorporated into and provide a visual element as part of this specification, illustrate one or more embodiments of the present invention and together with the detailed description, serve to explain the principles and implementations of the invention.

FIG. 5 illustrates the die cut, folded pocket 4-panel cover with a perspective and expanded view of smartphone attachment layers, Nano pad, Nano buttons and optional 2-sided adhesive layer for textured smartphone backs;

FIG. 6 illustrates an expanded perspective view of the straight cut top and bottom panels at spine in another version of the smartphone cover with the die cut, folded and sealed pocket;

FIG. 7 shows an extended pocket version that seals at the fold 90 and illustrates all layers prior to attachment and folding;

FIG. 8 shows a perspective view of a the extended pocket smartphone version folded and sealed with all attachment layers expanded with pocket Nano buttons;

FIG. 9 shows an expanded perspective view of the 8-panel double thick smartphone cover version with additional die cut credit card pocket, smartphone mounting layers and 2-sided attachment die cut layers prior to folding;

FIG. 10-A shows a flat view (adhesive layered version) of the tablet, e-reader 4-panel portfolio interior layout with micro-cuts, scores and alignment holes prior to print customization;

FIG. 10-B shows a flat view (adhesive layered version) of the tablet, e-reader 4-panel portfolio interior layout with exposed adhesive attachment areas, micro-cuts, scores and alignment holes prior to print customization;

FIG. 10-C illustrates a cross sectional view of the composite main structure used in tablet and e-readers with the respective self-sealing adhesive layer configuration;

FIG. 11-A illustrates a perspective exterior view of a near folded (adhesive version) of the main layout sheet with exposed inner adhesive areas shown in light grey;

FIG. 11-B shows the flat layout view of a folded exterior, sealed (adhesive version) in post print form with the micro-cut removal started to separate the cover from the host composite material;

FIG. 12-A shows a perspective view of the near folded heat sealed version of the composite tablet or e-reader portfolio cover prior to sealing the grey area between micro-cuts;

FIG. 12-B shows a die cut, scored and folded 4-panel portfolio tablet and e-reader cover with sealed sheet edges and sealed areas to micro-cut perimeter prior to printing;

FIG. 13-A shows an expanded perspective view of the die cut insert substrates which make up the cushioning, protective shock layers and Nano polymer attachment pads used in both versions (adhesive & sealed) of the 4-panel tablet and e-reader portfolio covers;

FIG. 13-B illustrates a cross-sectional view of the layers used in the back cover die cut cushioning insert and Nano pad attachment base area;

FIG. 13-C illustrates a cross-sectional view of the layers used in the front cover die cut cushioning insert and Nano pad attachment base area;

REFERENCE NUMBERS USED IN DRAWINGS

Figure 1:
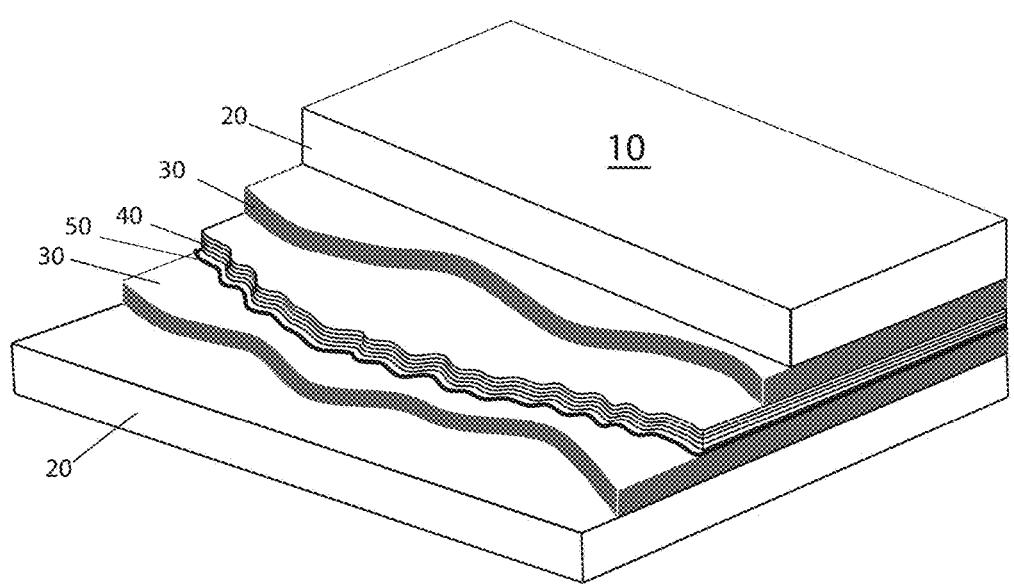
FIG. 1 shows a cross-sectional, layered view of the composite structure used in the embodiment of the covers and cases.

Moving now descriptively to the drawings, where similar characters or numbers denote similar elements throughout multiple views, the figures illustrate the structures, layers, attachment plates, covers, cases, inserts and one or two-sided Nano suction thermoplastic rubber polymer attachment pads elements for the system of the present invention. With regard to reference numbers used, the following number system is used throughout the various drawings and figures.

DETAILED DESCRIPTION OF THE INVENTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application, mailing and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

For ease of reference, certain terms are clarified herein. Rectangles are generally understood to include squares. Ovals are generally understood to include circles. "Top" and "bottom" in reference to a smartphone, tablet, e-readers covers and case systems do not refer or imply an up or down position relating to the ground. "Top" refers generally to the location of where the camera and/or cameras located on the device. Normally powered on device screens have a menu bar, date, time and or phone number at the "top" of the device where the camera ports, mics and controls are found. "Bottom" area usually contains main power connector ports, speakers and home button. For all electronic devices the developer refers to "front" or "back", "front" being the glass face and "back" being the hand held surface where batteries reside opposite of screen side.

Referring to FIG. 1 through 14, the first embodiment of the adaptable die-cut, compostable composite smartphone and tablet, e-reader or electronic mobile case and/or cover device kits are shown with die-cut composite cushioning inserts and pocket stiffener. The largest structure in the first embodiment used in the covers and case kits is comprised of a new environmentally friendly, composite structure 10 for smartphones and 400 for tablets or e-readers. This eco-composite material is made with multiple layers of compostable or plant based biodegradable resins in varied thicknesses, densities and properties to enhance the performance of the cover or case when fused together with the acid free, print receptive fiber carbon neutral substrates.

Figure 2:
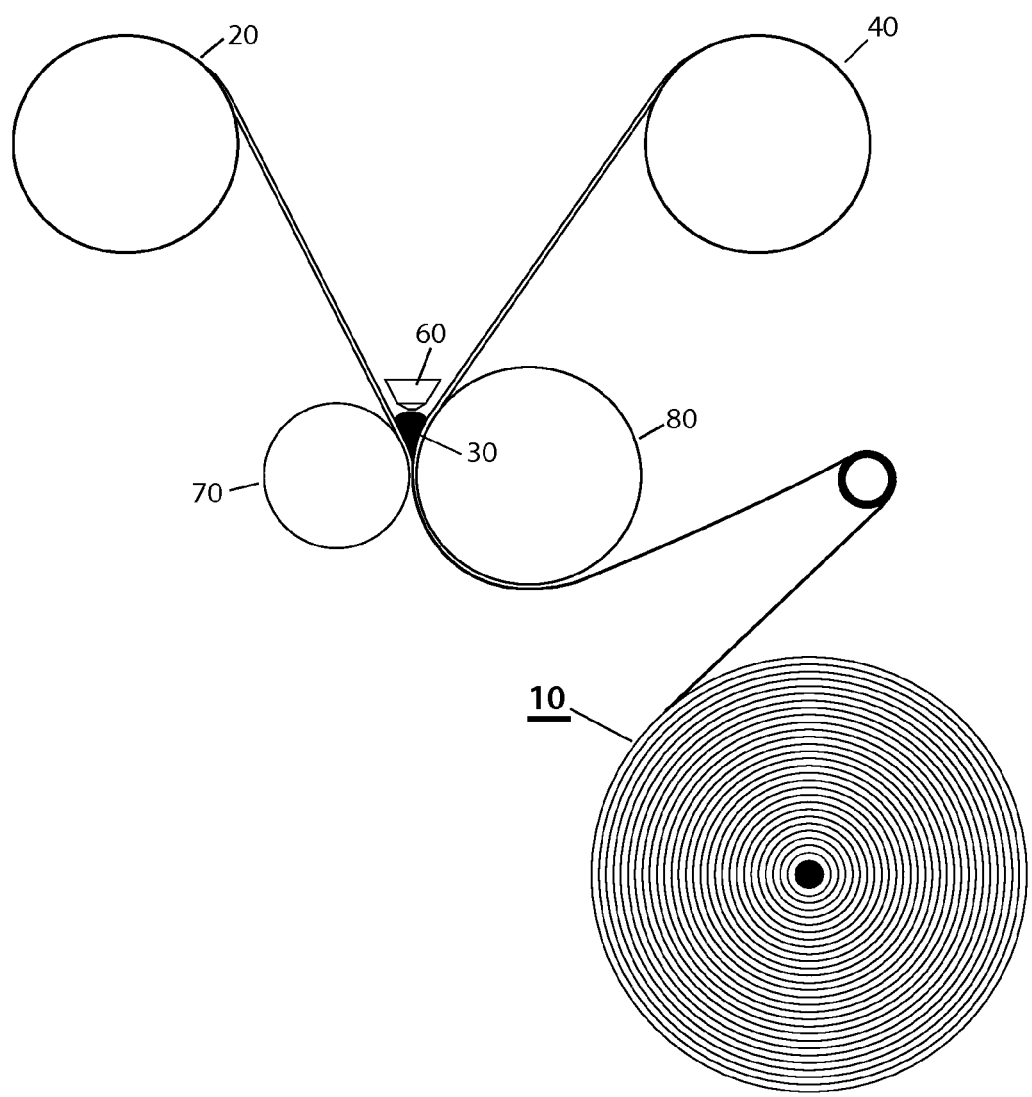
FIG. 2 shows a basic diagram of the heat extrusion lamination process for the substrates used in the composite structure.

Using an LDPE type co-extrusion with a self-sealing layer in a food grade quality film with a thickness between 2-to-6 mils, the composite is manufactured to ASTM D6400 standards for compostability in certified landfills with compostable resins. This composite structure in 7, 9 or 18-layer film 40 is heat extruded to reclaimed industrial cotton fiber layers that are remanufactured in roll stock form as shown in FIG. 2. This carbon neutral fiber substrate is infused with a either compostable EVA bonding resins, plant based bio-resins and/or PBT, PLA, PBAT, PBS, PBSA resins as each fiber layer 20 is applied to both sides of the composite film layers 40 through an apparatus called a heat extrusion laminator. The heat extruder process uses an extrudate 30, in the form of a compostable bonding resin heated to 525 F degrees combined with pressure to adhere and lock the substrate together. As thinned, heated resin is forced through a slot die 60 spanning the webs across the width of the two different substrate rolls 40, 20 in the area 30. This is where both angled webs merge from a V-shaped unwind path and are merged into one roll at the point of contact between rolls 70 and 80, as the both circumferences meet and apply even pressure onto the web materials about to be fused across the width of the contact area. Prior to this point of contact where the two different substrates meet, the molten, heated resin forms a bead in the area 30, where the rolling resin saturates the expanded fiber weave of the exterior substrate 20. As the pressure roller 70 and chill roller 80 turn, they force the molten resin into the hot fibers of the substrate, infusing and encompassing the compressed connected fiber layers with bonding resin using 2,000 lbs of pressure per square inch across the width of the now combined web. Within a ¼ rotation of these combined rollers 70 and 80, the composite is fed though the system out of the molten area and onto the chill roller which cools both substrates as the web is re-tensioned. The composite material then passes across surface radius of the chill roller and the composite is rewound onto a master roll 10 as shown in FIG. 2.

The cooled bonding resin interlocks the plastic layers and the fiber substrate together for a bond that is 60 microns deep. Infused resin penetrates into the long curly compressed strands of cotton fiber which are typically 15-to-20 microns thick each and 35 mm-to-45 mm long. This fiber substrate roll stock ranges from 75 microns to 500 microns in thickness depending on size of the cover or case product. The cotton fibers used in the manufacturing of the substrate is unlike other plant or synthetic fiber as it is easily infused with a heated EVA, plant based bio-resins and/or a PBT, PLA, PBAT, PBS, PBSA resins. The combined structure provides an extremely strong, flexible composite sheet 10, 400 with resilient characteristics similar to thin leather. Other plant based fibers such as hemp, kenaf, jute, banana, straw and flax may work as well if the glue or lamination processes of combining substrates forms a bond strong enough to survive continuous flexing and heat sealing. Cotton is the preferred main fiber in the exterior substrate because it is minimal processed and even less so with a reclaimed industrial fiber that is acid free, withstands higher heat in sealing and has archival print qualities found in art papers. Cotton also has high strength for extended use, may be manufactured with different tactile textures and finishes. Fiber creasing is minimized when fused to the plastic multi-layered flexible composite structures using the heat extrusion process. Cotton is also 100% biodegradable and is carbon neutral. Other fiber elements such as linen and wool may be added to the cotton fiber substrate to change or enhance the characteristics of the exterior substrate and extend use.

Without limiting the process to bond flexible plastic to paper; heat activated dry lamination, cold or hot wet laminations, ultrasonic induced laminations, 2-part epoxies, acrylic or rubber hybrid glues, solvent based chemicals, polymers or coatings may or may not work with success and/or may show the same desired result as an heat extrusion lamination bond with or without polymer or nano additives. Other additives including nano particulates or chemistry may be used to achieve a better molecular bond with the cotton and the flexible plastic layers may utilize an optimized nano resin chemistry or nano particulates. Nano chemistry and nano particulates may also be used in the surface coatings of the cotton exterior substrate to enhance ink reception while adding water resistance. Nanoligin and nanocellulose particles may be added for strength and extended the lifecycle of the product or improve print performance. The following resins may be used in the heat extrusion process but not limited to, are: LDPE, LLDPE, mPE, EAA, EEA, EVA, PBT, PLA, PBAT, PBS, PBSA and ionomers with oxy-degradable and/or plant resin additives for both conventional plastic low density films, elastomer films and films made with plant based resins. Different combinations of the flexible film substrates, different orientation of layers, sealing components in the structure 10, 400 are not limited to and may include different 7, 9-to-18 layer substrate film structure components, fewer or more layers, different combinations of layers and/or film components made from or by other film manufacturers to achieve different or improved characteristics and/or properties such as strength, bond retention, tear resistance, flexibility, biodegradability and reducing the carbon footprint during manufacturing. Also included with-out use or limitation to and in the composition of the structure are PLA, PBAT, PBS, PBT, PBSA based resins, starch based and plant based resins, modified bio-resin elastomers, synthetic papers, adhesives, wood cellulose papers or fibers, plant fiber based papers, linen paper blends made with cotton and/or wool fibers, non-woven flexible substrates, micro-fiber, flexible woven layers or substrates in addition to and/or in combination with woven fabric blends added in layers with similar or different properties. Resins and substrates may be fused with magnetic heat induction, microwave energy, lasers, infrared heat, heated gravure, heated molds, hot melt glue systems and/or ultrasonic welding processes during the manufacturing of the composite structures and may be used in addition to, and realized within this embodiment as well to achieve improved or enhanced texture, strength, flexibility or sealing characteristics and properties. Covers and cases use the same structure materials in various thicknesses, sizing and textures, these properties are dependent on the mass of the product, how the case or cover is printed, handled, shipped and used through a commercialized sales channel in the retail environment.

Before moving to the simplest cover embodiment in description, disclosure of the methods used to die cut, seal, score, fold and trim of the sheeted pre-prints must be made. All production processes used post heat extrusion in the manufacture of the composite are either made in single processes with common roll-fed sheeting machinery, auto platen sheet or roll fed letterpresses, rotary web die cutters and high powered roll stock robotic lasers cutting systems areas or in a combination of processes. These single processes may or may not be combined with the use of a Totani flexible bag converting machine augmented with an attached die cutter or laser cutter inline. Using multiple types of machinery in combination for production may be the best fit as the developer refines production for each cover or case.

Figure 3:
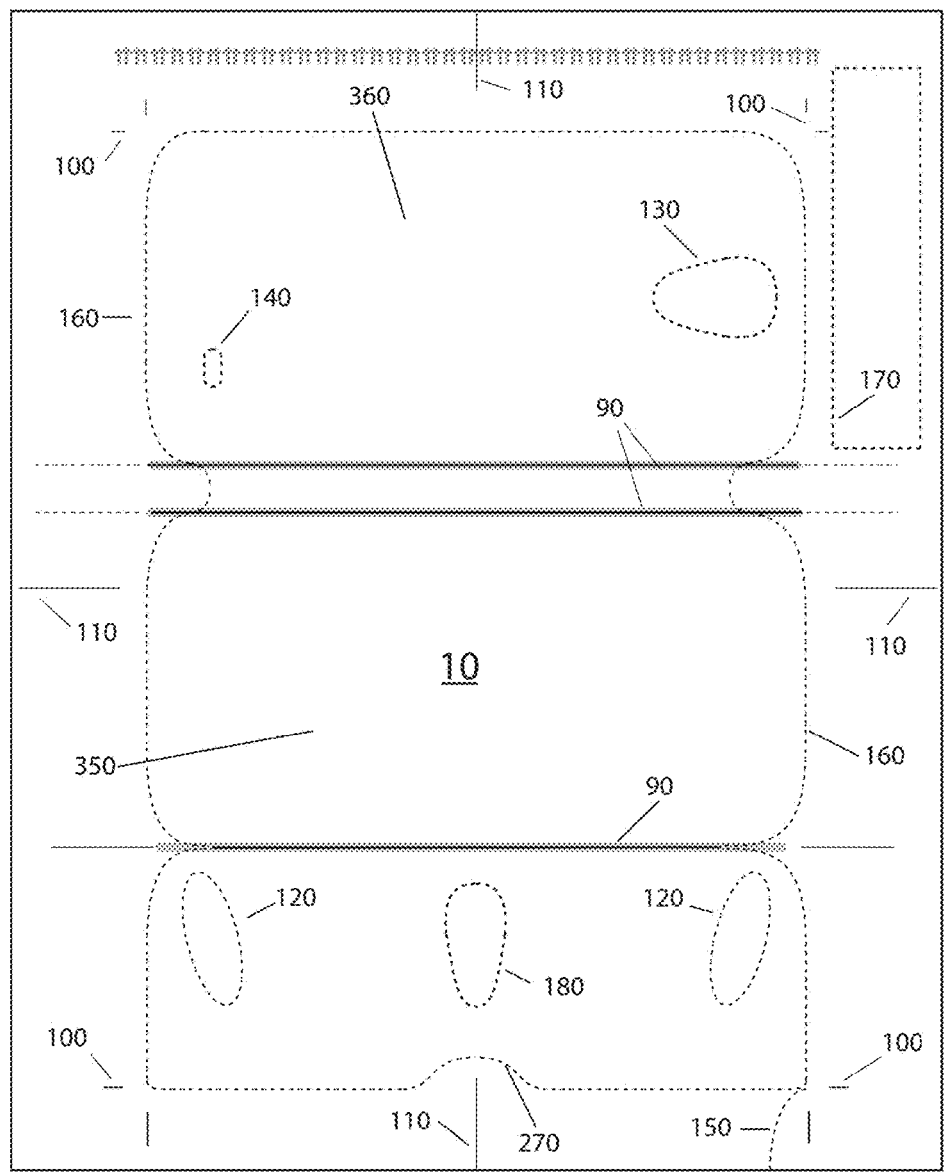
FIG. 3 shows the first embodiment of the sheeted, scored and micro-cut layout for the 4-panel pocket smartphone cover.
Figure 4:
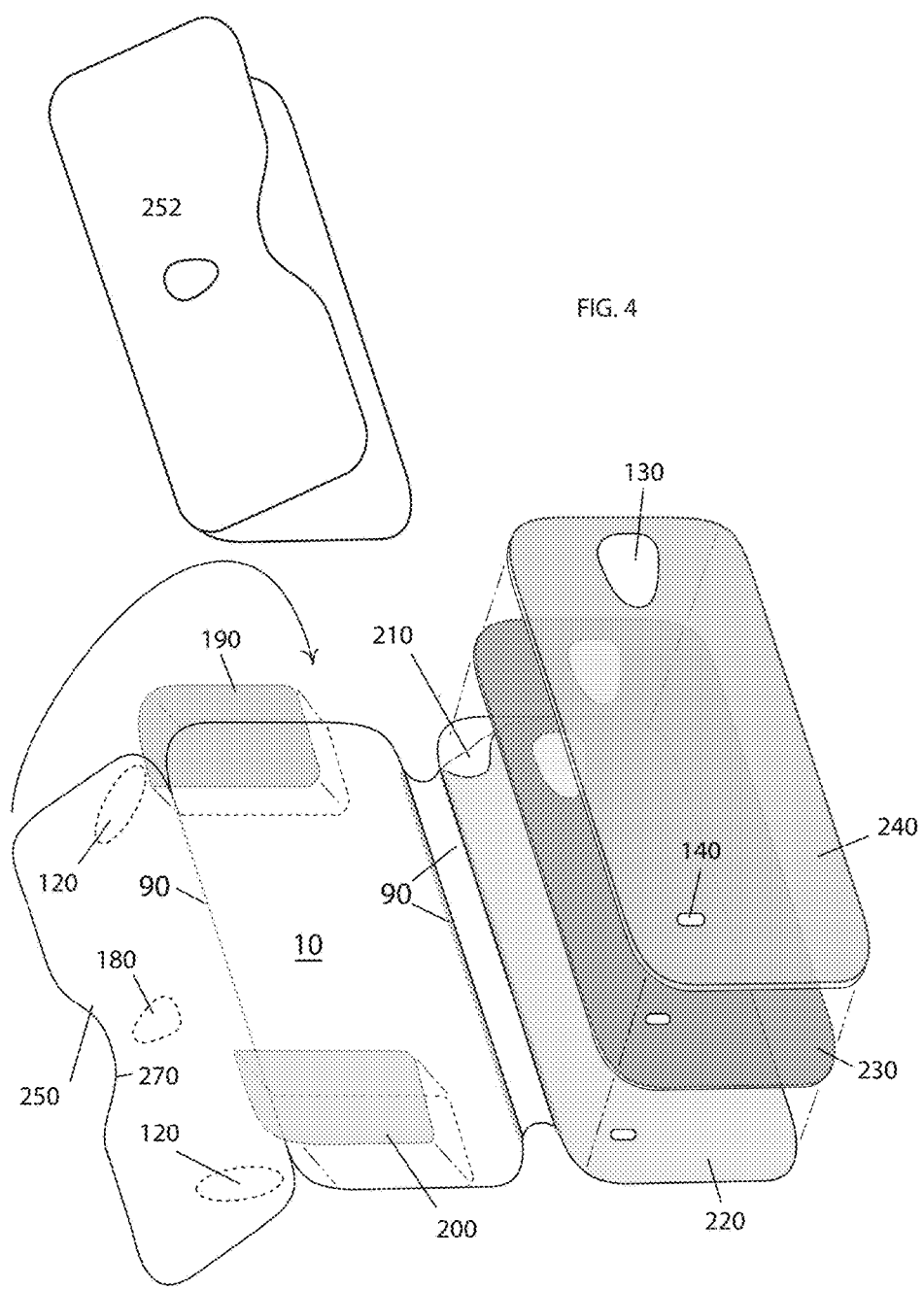
FIG. 4 shows a perspective and expanded layered view of all die cut parts except for Nano buttons used in the 4-panel pocket smartphone cover prior to folding along with shaded adhesive layers and the optional black cotton insert stiffener.
Figure 14:
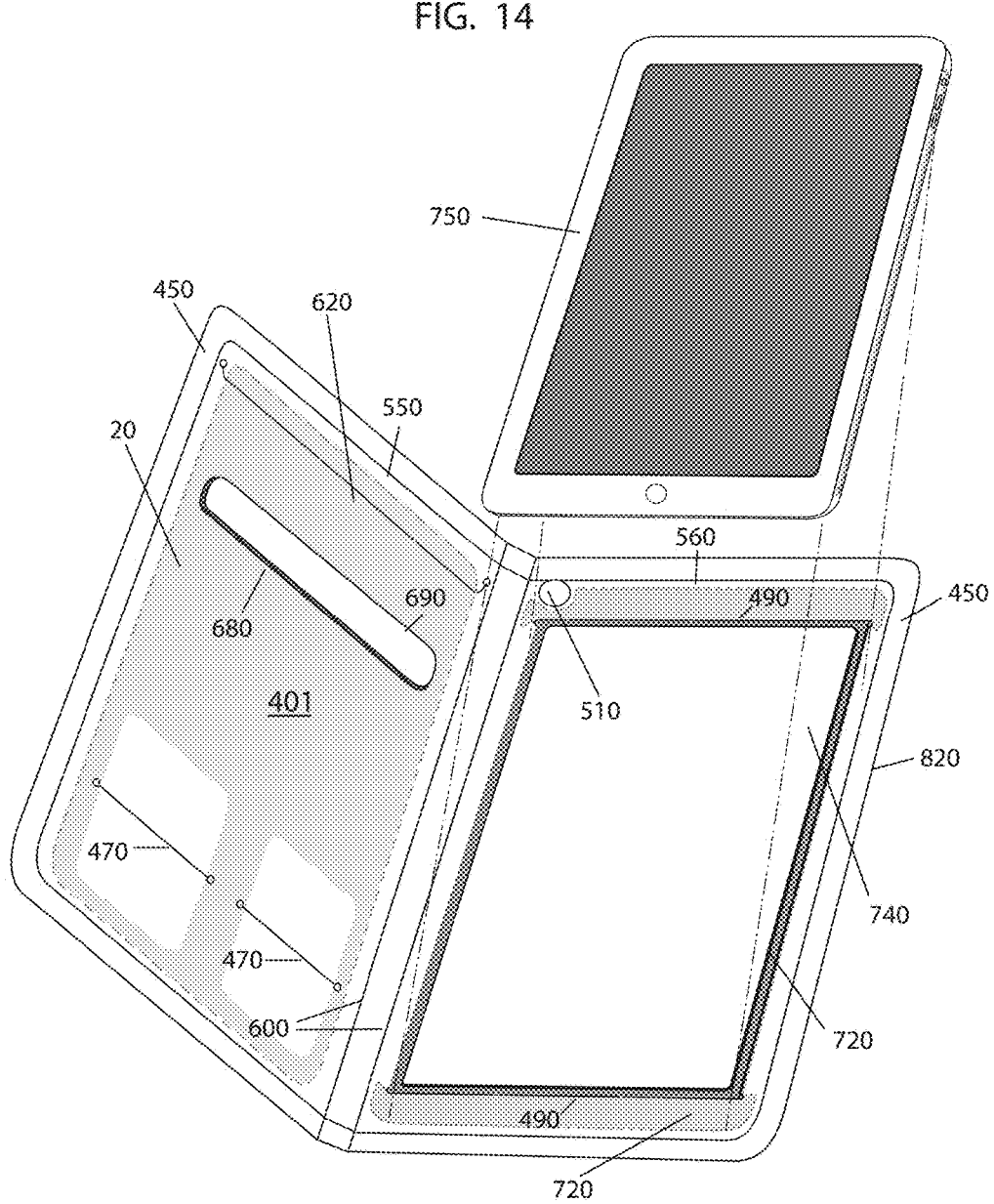
FIG. 14 is perspective view of both versions of the 4-panel tablet or e-reader portfolio cover with cushioning inserts and Nano pads installed.

Now moving to the smallest, simplest smartphone cover as illustrated in layout 10, FIG. 3, in sheeted, pre-cut ready to print form as shown in 8½"×9.5" or 8½"×11" size. This 2-sided, blank pre-print layout illustrates the flat die cut micro-cut elements 120, 130, 140, 180 and heated parallel scores 90 placed over three contiguous, micro-cut panels 250, 350, 360 with their respective micro-cut perimeters at 160. Heating and compressing the spine score at 90, with 350 F degrees briefly for one second or more using a rounded edged, V-shaped die form made of steel, brass or magnesium produces a indentation in the fiber weave where the bottom of the rounded V strikes the composite score area with the grain direction. This indentation acts as hinge as the heated bonding resins are redistributed through the scored, compressed cotton essentially plasticizing all localized fibers. Lasering also works well by evaporating away fiber in the area of the spine, this forms a V-shaped score channel for flexing. Options for covers may include straight cut panel tops and bottoms at perpendicular to the spine as shown in FIG. 6, in areas 280 and slightly different panel die cuts on the pocket panels at the face of 270. This cover embodiment with all the elements in the foregoing description is centered within the trimmed host sheet to provide accurate two sided printing as bleeds, images and text laid out to electronic templates must align with micro-cut perimeters for front and back printing. The cover floats internally within the host sheet as bridges of small composite material are left from the micro-cutting process. Using a laser, micro-file or a miniature carbide rotating cutting wheel disc, the die-maker is able to eliminate small areas called slivers or bridges in the die cutter path by grinding or cutting away vertical slots on the thin micro-cut die blades used in the die board. These omissions in the micro-cut blades allow for thin slivers of connective material to be left untouched in the path of the micro-cut impression at 160. Using a robotic roll fed laser cutting systems to cut both sides of the print sheet 10 perimeter using laser positioning and analysis software offers better control and a more refined cut without defects. This method is the preferred choice for micro cutting all parts and scoring as every cover may be made on demand using the same roll stock without dies.

Once the cover is printed on both sides, the consumer may continue to remove the other micro-cut parts 120, 180 and then peel away the host material post print at micro-cut starting point 150. Once the unit and panels are free, the consumer may add 2-sided, die cut adhesive tabs in areas 190, 200 shown in FIG. 5 on panel 250 or 350, so that panel 250 may be folded over 180 degrees at score 90 between 250 and 350 towards the spine between panels 350 and 360 respectively. An optional 4 panel black cotton die cut 0.5 mm stiffener insert 252 illustrated in FIG. 4 may be applied to the inner fold area of the pocket as well between panels 250 and 350 by folding the die cut form in half, removing the release liners on the inside of the insert in areas 190, 200 and aligning panel edges together to form a sealed pocket. Once sealed at 190, 200 the release liners may be pulled off the exterior contact surface of the stiffener. This exterior adhesive layer will seal against the inside panels of the front cover panels when the consumer folds 250 over to align with 350. Now panel 250 forms a credit card pocket as shown in FIG. 5 and the die cut Nano thermoplastic rubber polymer suction buttons may be placed carefully within the die cut holes to the adhesive exposed in the cavity. For clarity, one could also say that these Nano thermoplastic rubber polymer suction buttons are placed on the top and bottom end of interior front smartphone cover panel in the open die cut holes now sandwiched with a 2-sided adhesive. Once placed into sealed panel 250, and securely nested into elliptical cavities left from extracted the composite elliptical die cut 120, these Nano polymer buttons 120 have a slightly higher contact surface than the folded-over, sealed panel 250. The buttons contact surfaces are elevated at about 1 mm higher than the surface of the sealed pocket panel 250 to allow for constant contact to the glass smartphone surface as the credit card pocket will house at least one credit card. The Nano thermoplastic rubber polymer suction buttons 120 elliptical shape reduces the initial friction at the contact separation start area and allows for gradual release and removal from the glass device surface as flexing of the composite in flap 250 is limited by multiple adhered layers and credit cards placed inside the pocket. Other shapes may work such as kidney shapes or ovals may work as well. These strategically placed Nano thermoplastic rubber polymer suction buttons may now be sealed directly to glass surface of the smartphone locking all panels in place for a cleaner more fluid insertion and extraction of the smartphone into and out of pant or jacket pockets. Locking the cover to the device glass offers more protection for occasional drops and also minimizes torsional twist on the spine area, extending the life of the cover.

The next step in building the cover is removing the speaker port 140 die cut and camera die cut 130 out of the composite body in panel 360 and aligning all of 130 and 140 die cuts with the clear plates 230 to 360 as the release liner on the adhesive is removed 220 prior to mounting the clear plate to the printed surface of 360 on the inside back cover panel. Now the thin protective plastic film layers may be removed from both sides of the die cut Nano thermoplastic rubber polymer double-sided suction attachment pad exposing the sticky face of the suction material 240. Next, remove the same die cut ports 130, 140 for camera and speaker and align the die cut Nano polymer suction attachment pad 240 to the same die cut perimeter and ports as found on the previous mounted clear panel 230 that is mounted with adhesive to panel 360. For all textured smartphone backs there is an optional smooth coated plasticized 2 mil, die cut label 380 with a smaller adhesive contact footprint 260 used when the smartphone is mated to the Nano thermoplastic rubber polymer suction pad or used when mounting the smartphone and Nano pad are mounted together on other surfaces. This label 380 is attached by releasing the liner 260 and applying the 2 mil permanent adhesive to the back of the smartphone. Removal, if necessary is performed with a hair dryer to remove the rubber and acrylic hybrid adhesive bond with heat. To instantly remove the Nano polymer attachment pad from the smooth plastic plate 230 the developer has included a thumb notch 390 on the clear plastic mounting plate near the spine allowing for the tip of the thumb or finger to flex the Nano thermoplastic rubber polymer suction pad 240 while slightly rolling and flexing the material off the smooth clear plate mounting material 230. Other polymer based Nano materials with adhesive and/or attachment capabilities may be used without limitation and may include microfibers, microfilaments or micro-fingers, patterned surfaces suction, gecko inspired pattern elements when some of these products become more commercialized and readily available. Micro hook-to-hook connectors, micro hook-to-micro loop connectors may be used as well as flat high powered magnets with shielding layers for attachment of covers to smartphones or to the cover substrate. As another option it is also possible to chemically coat the cover panels with a clear varnish, clear polymer, ScotchGuard and/or an clear epoxy fast drying coating once the images are printed, then adhere the Nano thermoplastic rubber polymer suction pad directly to the inside cover cotton exterior surface on panel 220. Additional coatings, chemicals and sprays added to the composite greatly effect landfill degradation, increase carbon footprint and add to increased cost for the consumer. The preferred attachment material for the smartphone covers may be the Everstik Nano thermoplastic rubber polymer suction pad material as the developer contemplates and tests other materials that are compostable or may be recycled. Current materials are die cut in 2.3 mm thick sheets, manufactured in double-sided material fused with an internal 4 mil plastic PET layer to combine (2) single sided Nano polymer sheets together as one composite unit and/or a single layer of polymer with micro-suction on both sides. This is adhered to the smooth clear attachment plate 230. As other manufacturers produce new types of Nano suction materials the thickness may decrease or increase depending on the amount of attachment need to support wet or dry adhesion on varied textured surfaces. The attachment pad included in the smartphone cover embodiment will adhere to nearly any nonporous flat or vertical surface for extended periods if surface is smooth and dry. This Nano thermoplastic rubber polymer suction material is also reusable for up to 2,000 attachment cycles, washable with mild soap and water.

Overall sheet size is dependent on conversion of the folding elements in the smartphone cover embodiment and directly related to the external dimensions of the flat electronic device. These variations shown in FIGS. 7, 8 and 9 will require larger sheet sizes. 8½"×11" print host sheets are an average size for the extend pocket opening at 270 where die cut face nearly touches the spine in area 90 as illustrated in FIGS. 7 and 8. The largest, double thick version with an adhesive inner layer will require 8½"×17" for extended panel area in the version layout as shown in FIG. 9 with the expanded perspective view. These versions are all assembled in the same way as the first version in FIG. 4 with the exception of the double-sided 4 mil, die cut permanent adhesive label 310 as this element needs to carefully aligned with ports 130, 140 prior to attachment. Consumers may align and remove one side or a portion of the die cut release liner at a time. The next step, is removing the internal parts that are die cut at 330, 370 on panel 290 and then the removal of 130, 140 and 340 on the double-sided label stock 310, before inserting the permanent adhesive between the mirrored symmetrical panels and the micro-cut perimeters 160 of the unit that is to be sealed. By removing die cut holes from the composite at 190, 200 and nesting the Nano thermoplastic rubber polymer buttons down into the die cut cavities through panel 250 one may adhere each button to the adhesive lined surface on the inside of panel 350. The smooth attachment plate 230, uses a peel away adhesive release liner 210 and mounts directly over the printed panel 360 after removal of ports 130 and 140. Once 360 is mounted the Nano thermoplastic rubber polymer die cut attachment suction pad 240 for the smartphone device may be added as all the ports 130 and 140 are opened and aligned with the perimeter die cut.

Now moving to the larger flat electronic device covers and case kits, and reviewing FIG. 10-A, the flat layout 400 illustrates the attachment inside panels with the aligned adhesive layers and all of the die cuts, micro-cuts with the two shaded areas 470 to be removed on the adhesive layer prior to sealing the adhesive layers together as illustrated in cross sectional view FIG. 10-C on page 10. Shown as the first tablet cover version of the larger cover embodiment, this adhesive sealed version is universal in design as a protective cover for all tablets, phablets, e-readers and flat hybrid electronic devices. This adhesive sealed version uses the same Nano thermoplastic rubber polymer attachment suction material, processes and structure materials as similarly illustrated and used in the smartphone covers in FIG. 4-9 with the heated V-shaped scoring to maximize the life of the fold. Cover variations within the larger cover embodiment for different devices are only found in the physicalities related to height, width, thickness, curvature, radius of the form factors corners as well as the camera lens and flash unit locations. Overall shape, and cover design is the same for all flat electronic devices as the attachment pad minimizes the need for intricate die cuts, encompassing structures that hide part of the tablet where it is handled. As a kit, consumers may customize their own units with variations to included additional pockets and Nano TPR attachment pads, die cuts, more or less cushioning, straps, 3-D directly printed attachments, stylus connectors, magnets, paper note pads and other attached accoutrements as space on the panels permits.

The adhesive version 400 on FIG. 11-A and the heat sealed version 401 on FIG. 12-A are slightly different in that the adhesive version 400 will need be sealed post print by the consumer and the heat sealed version 401 is sealed during the manufacturing process. Materials are the same with the exception of the following subset of adhesive layers used in the 400 die cut layout composite listed in order from the mated surface on the inner 810 film wall of print composite subset, 410—a release liner, 420—a permanent adhesive 2 mil layer, 430 a polymer 1 mil film layer, 420—a 2nd layer of 2 mil permanent adhesive and 412—a 40 lb white patterned silicone facestock. This buildup of adhesive layers and custom micro-cut release liners as shown in FIG. 10-C uses the same mirrored die as the composite print substrate subset for the exterior panel walls. Combined together with the print substrate composite, these layers provide the self-sealing layers to the layout 400 on the opposite side of the pre-printed 4-panel layout sheet and must be joined prior to printing since some printers will not print plastic layers. The consumer removes all of the through-cut areas in the adhesive subset shown in the grey round cornered rectangles near the business card slits at 470 so inserted cards will not stick to adhesive areas. Next the die-cut 7 mm holes 440, 530 are removed from both printer and adhesive subsets and pencils are inserted into the (3) holed asymmetrical pattern on the printer composite subset. Now the adhesive subset release line on 410 may be totally removed and the exposed adhesive side 420 may be positioned towards the 810 side of the film on the printer composite. These only lineup one way as alignment is critical with the mirrored, die cut of materials cut with the same rotary or platen die. Carefully sliding the pencils through the adhesive side as they rest in the 440 and 530 holes in the printer subset wall, the two sheets may be joined by sliding the two subsets together horizontally on a shelf or table. Before the panels touch, carefully check the alignment of all the mirrored micro-cut perimeters as this element is most critical for post print host removal. If the micro-cut perimeter aligns properly at close proximity then gently seal one corner of the single pencil side and slide seal the edge area to the closest corner. Gently placing this started side on a flat table surface, sealing the unit by hand in the middle first with an outward stroking motion, using minimal pressure to avoid wrinkles. As the subsets are sealed from the inside outward the pencils will eventually fall out and all micro-cuts should be perfectly aligned without any wrinkling of the surface. Without removing any micro-cut release liners on the sealing adhesive layer 412 on the opposite side of the now joined composite print layout 400, the structure with all its micro-cut and die cut panels is ready to print. Once print personalized, the consumer will be able to remove all of the micro-cut patterned release liner in area 450 between the perimeter micro-cut 820 and the outer perimeter panels of 550, 560, 570, 580 exposing the seal element as shown in dark grey on FIG. 10-B. The next step is to open up die cuts in areas 460, 480, 490, and remove 510 and 520, the round die cut holes for camera lens. This dark shaded grey area as illustrated in FIG. 10-B is now exposed and permanent adhesive seal 450, as part of the whole joined composite is the layer that fuses all of the mirrored 8-panel layout together as each of the 4-panels are folded in half on line 590. All units on both versions will need a letterpress heat sealed V-shaped score made prior to printing using a brass, steel or bronze backing plates on areas 590 and 600 for both print and adhesive sheet composites builds, identical to the process used in the smartphone covers to minimize wear and fiber fatigue at the folds.

Dual inline rotary die cutters would be the best method of manufacture but also the most expensive process for manufacturing and assembly of the adhesive sealed version of the larger cover embodiment. One web with the adhesive subset composite roll stock comprising of layers 410, 420 and 430 with the round cornered square elements 470 as shown in shaded grey on 10-B removed in two areas as through-cut die cut is extracted with a vacuum, then the release liner 410 is striped away from the subset composite exposing permanent adhesive layer 420. Layer 420 is now exposed and facing the plastic layer 800 side of the print subset composite web with the print substrate exterior facing down as all layers are fused together as one flexible composite. As the two aligned webs are joined together as one pre-print composite as shown in FIGS. 10-A and 10-B. The joined layers are shown with the cotton print exterior is facing down with all common micro-cuts and die cuts. These areas are all die cut at the same time. Cuts are made to each panel through the entire series of composite layers using the second inline die cutter unit. As sheet emerges from the die cutting unit and the flat composite pre-print blank is centered, trimmed and ready for V-shaped heat scoring at 590 and 600, in a secondary sheeted process on a letterpress or a third process using a rotary sealer placed inline post die cutting. Once printed using an ordinary inkjet, UV or color laser desktop printer, the consumer removes the micro-cut paper release liner on the non-printing side in all areas 450 between 820 the outer cover perimeter to the panels 550, 560, 570, 580 outer perimeters as shown shaded in grey in FIG. 10-B. This area is removed post print by the consumer exposes the permanent adhesive layer 450 on the non-printing side of the sheet. Composite cushion group inserts as shown in FIG. 13-A for the front cover with their respective layers 640, 650, 660 may now be placed inside panel 550 by removing the extended paper release liner, aligning the die cut cushion insert to the panel 550 die cut opening at 680 and sealing the cushion insert panel 660 to the exposed the adhesive layer within the perimeter of 550. Composite cushion group 700, 710, 720 panels may now be fitted inside the die cut areas of 490 at top and bottom of the inside back panel cover 560. The double sided Nano suction attachment pad 740 may now be fitted directly to layer 720 or a single layer Nano may be adhered to the 720 layer with a die cut double sided permanent adhesive layer 730 to the Nano suction pad. Viewing FIG. 11-A, the consumer then folds the sheet in half on heated score line 590, fitting and registering the mirrored panel 550 to 580 and sealing the balance of flat area by using hand pressure. Additional die cuts may be added using printed lines as guides applied to the digital layout, consumers may then print the layout and hand cut the structure where desired with an exacto knife for additional pockets, attachments, strap holes or customization. The back inside panel, device mounting composite insert may be added post sealing as it slides into die cut elliptical areas at 490.

Moving now to the 4-panel composite heat sealed larger tablet, e-reader and flat electronic device covers and cases, in this version of the embodiment as shown in FIGS. 12-A and 12-B there are slight variations to layout placement, structure components and the sealing of the folded die cut, pre-print blank layout 401. Looking at FIGS. 12-A and 12-B in folded and sealed illustrations the exterior substrate is shown as the outer layer 500 and the 8-panel layout folds in half on its self-sealing layers 810 at score line 590. Adhesive layers 410, 420 and 430 are omitted altogether, instead the composite layout 4-panel is sheeted or left on a narrow web and flat micro-cut through areas 460, 470, 480, 490, without removing the rectangular areas surrounding the business card slits on panels 550, 560. This version of the cover or case embodiment is similar to the smartphone cases except sealing is a mechanical, heated process leaving pocket areas between folded and sealed panels for insertion of the cushion mounting and closure inserts. The 4-panel flat composite heat extruded structure, with layers 500, 800 and 810 is sealed when half of the flat layout 401 is folded over 180 degrees at the heated score line 590 and heat sealed onto the self-sealing layer 810 incorporated in the heat extruded composite. During the sealing of the perimeter, score areas 600 may be heat scored using a sculpted V-pattern tooling with a backing plate forming a fused fiber hinge at the spine as discussed in the adhesive version. This process step to 600 may be completed in a separate process using a letterpress heated die and the same tooling. Using 350 F degrees of heat with 4,000 lbs of platen pressure placed on both sides of the folded cover layout 401, the two heated mirrored dies with their respective adjacent chiller plates are used to seal shaded perimeter areas 450 along with intermittent side seals 830 and the full continuous lead edge 590 at the same time. These areas 450, 590 and 830 are shown in the grey shaded areas on FIG. 12-B. Heat seal binder forming equipment with additional chiller plates and Totani packaging converters are both capable tools for the sealing task as well as some modified letterpress platen equipment originally used for foil stamping. Once the folded layout is sealed, the outer tear-away perimeter 820 is micro-cut through all layers along with the camera lens port 520 on panel 570 along with host removal start at 630 on the lead edge of the sheeted layout 401 and also final trims may be incorporated into this die board for sealed edge re-trims at 830 for the sides, 590 for the lead edge and 760 for the tail edge. Layout of the folded panels is centered horizontally and vertically within the folded final pre-print sheet allowing for at least 36 mm non-print area at either end of the sheeted pre-print blank for printing.

The heat sealed structure is best folded, sealed, die cut and trimmed using a Totani flexible packaging converting machine with an attached folding former for folding the heat extruded web material. The composite structure is folded best with the grain in the linear direction of the web on to its own self-sealing layers. Totani converters have ability to seal two sides at once of the folded web using CNC custom cut, heated die sealing plates. These shaped and/or sculpted sealing plates use variable dwell adjustment, variable temperature control and flat chiller plates adjacent to heated dies plates. Totani's are designed to be attached to an inline die cutter to micro-cut the composite web structure before the sealing die process and/or post sealing die process while the two processes are performed in register using an electronic eye and variable servo motors controlling the repeat and register. Numerous tooling variations are possible with a Totani packaging converters, heated scores and zero tolerance dies may be placed in the CNC cut heated tooling. All the parts and layers may be through-cut in folded, sealed form in the areas 460, 470, 480, 490, 510, 520, 620 and 820. As these elements are micro-cut and areas of 450, 830, 840 are sealed, the V-shaped heated scores at 590, 600 may also be incorporated into the heated and sculpted steel die plates eliminating the need for a secondary letterpress process. The attached inline die cutter trims the product between seal lines 830, 840 after sealing and separates the pre-print unit from the folded web layers. Other forms of machinery may be used and the process may be broken down into more labor intensive, smaller processes using letterpress equipment, roll fed laser cutters augmented with a vinyl binder sealing system and hand folding.

Figure 15:
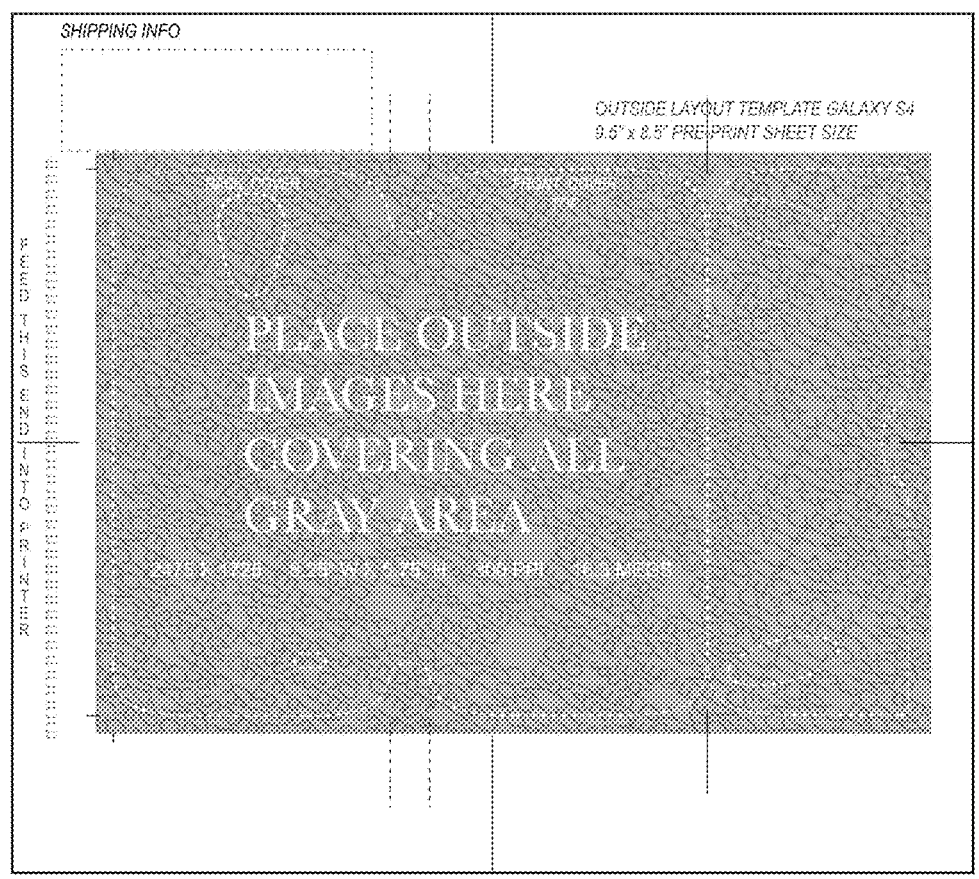
FIG. 15 illustrates the flat layout of one embodiment for the smartphone cover or case ready for print personalization.

The cover and case embodiments have been demonstrated throughout the detailed description illustrating the manufacturing, converting processes, materials and design aspects of the layouts IQ, 400 and the folded-sealed layout 401. Now exploring the printing and use aspects of the embodiments related to the covers and cases, starts with turning to the flat illustration of the layout shown in FIG. 15. Consumers who have purchased the cover kit for their device start by selecting the right layout template file and correct file format in their preferred operating system from the product website. Consumers new to building color to a template file may download an Adobe™ or Microsoft Word™ product free for 30 days on a trail basis using for PC or MAC OS based desktops, tablets or laptop computers. Cover and case layout templates are all created from the production master layout for each specific device so registration is as accurate as the consumers digital printer. ICC profiles may be embedded or layout templates may be offered without. Each layout template offers general dimensions and preferred standard sizes as a guide for one contiguous tint block called the image area. This image area is shown in the template layout as a tinted 4/color grey background and the layout is shown rotated. All layouts are offered vertically since they will be printed that way through the print path of a desktop printer, builders of the color print files may rotate the layout within the program to facilitate easier color builds and then rotate the file back 90 degrees for printing using the printer software for their perspective print device.

Starting with the simplest layout for the Samsung S4 as shown in FIG. 3, builders of the print files will need to find an original image(s) of their own and avoid using any copyrighted image. Most cameras shoot rectangle based digital images on a 1.33 aspect ratio of height compared to the longer width so finding an image that is horizontally long enough while allowing for vertical cropping is always a challenge as the layout image area uses a 1.5 ratio. Some cameras have stitch programs whereby multiple shots are pasted together and images may be easily cropped to fit the 1.5 ratio with bleeds. Using Photoshop™, consumers may assemble images in right reading mode in horizontal layers and make the necessary adjustments using all the tools and features to facilitate a finalized 1.5 ratio image with enough bleed. Getting all the pixel imagery in order first is the most important step and quickest way to layout a cover or case. These images once refined may be added by placing the image into the template layout using a program such as Microsoft Word™, InDesign™, or Illustrator™. Adobe Acrobat™ may also be used to edit the existing template layout by placing a new image in front of the existing tint block image and then bringing the image to "front" and saving the file for print personalization. These image layers in most graphic layout programs are placed in front or above the template layer using the layering tool box to instruct the software to print the desired layers in a print order hierarchy. Text may be placed over and/or above these imported or placed images. Text elements may be watermarked into the image using opacity tool settings and placed onto a separate lay for effect before flattening the image and saving the print file. 4/color layouts may be printed and proofed two sided using ordinary bond paper while the template layers are turned on to show element placement on the sheet and registration of the front to the back elements. Once the desired result is obtained with the selected layers, images and text, the next step is turning off the template layer completely and printing all the layers as proofed for each side using the sheeted layout. As shown in the layout, the die cut, micro-cut sheeted layout for the cases and covers is designed to be printed one way. Printer feed edges are marked and each layout is built so that the sealed trim edge is the lead edge printing first through the print path.

CONCLUSION, RAMIFICATIONS AND SCOPE

While the above description contains many specificities, these should not be construed as limitations on the scope, but rather as an exemplifications of several embodiments thereof. Many variations are possible as the covers and cases were designed as a kit whereby the structure is easily printed, painted or color personalized and modified structurally by the consumer for the attachment and access of other mobile related products that enhance the consumers mobile experience. As smartphones, tablets and other electronic device form factors are minimized in thickness through incremental advances in design, battery manufacturing and sapphire screens, smartphones, phablets and tablets will eventually become thin enough and flexible enough to fold. Current smartphones have dropped 2 mm thickness every 14 months and are now at under 5 mm with the newest OPPO R5. These embodiments for the covers and cases demonstrated in the description are better suited to thinner electronic devices that weigh less and in the very near future will have flexible and foldable displays. As more cell and mobile internet providers within the Cellular Telecommunications and Internet Association introduce green initiates to minimize e-waste consumers may seek environmentally better products for consumer DIY customization than plastic substrates.

Smartphone case and cover embodiments may include the following minor changes to the original embodiments as discussed within the detailed description; Adding a single or multi-unit bumper plate between the Nano suction attachment pad layers in plastic, aluminum, carbon or compressed organic fiber fused with bio-reins with lanyard anchors, this plate would protect corners of the mounted device; adding shock protection to the structure by adhering a single die cut layer of 10 lb density wool felt in 2 mm thickness between the fused pocket panels of 250 and 350 by using a single full panel, 2-sided die cut adhesive layer for attachment to panel 350, and adding an additional score or scores parallel to 90 to create more of a rounded edge at the fold; Adding holes or holes with grommets for clip-on straps or lanyards; Additional panels maybe added to facilitate more pockets and panel 250 may also be extended and mirrored as an additional roll-folded series of die cut panels that may be sealed as each panel folds inward and attaches to the innermost panel. This configuration may allow for additional credit card pockets and add additional protection as well; RFID and WiFi signal blocking plates may also be added to the pocket of the die cut layout prior to folding as well as die cut slits for a sliding or hidden mirror panels, additional credit cards and currency pockets near the spine placed underneath the folded composite printed structure area that mounts the clear attachment plate 230 for the Nano thermoplastic rubber polymer suction device attachment base on the inside back cover panel 360 using an altered 2-sided adhesive die cut sealing plate 310 to allow for a adhesive free cavity; Spine dimensions as far as depth may change slightly for adding a narrow panel of suction material, clip or plastic used to adhere styluses in notepad style smartphones; Additional Nano thermoplastic rubber polymer suction attachment pads may be added to the interior structure on panel 250 for paper note attachment and for in car use as the cover may be folded-over and attached to the dash when using a mobile location application for directions; Panels may be slightly enlarged to accommodate extending the Nano thermoplastic rubber polymer 2-sided device suction attachment pads if suction material manufacturers provide thermoformed die cut attachment pads to include shaped, sculpted pads; Structures and substrates may change with variations of color, fiber content, surface treatments and the minimal plastics used may all be changed to plant based bio-plastics. Consumers may also print directly onto the porous exterior surface with a 3D printer using current resins once the cover is printed with inkjets.

Tablet, phablets, e-readers and hybrid laptop covers and case embodiments previously detailed in the description may include the following changes to the structure, substrates and design such as; Additional thermoplastic rubber polymer suction pads for paper note attachment, stylus clips, cameras, lighting and other add-ons; Grommets and additional holes for straps, lanyards, handles, pouches, plates, corner bumpers, stands or clamps; Color or texture changes to substrates used in the structure materials; Magnet, magnet holders or sealed areas designed to slip in high powered magnets for attachment of other layers, add-on elements, on-off switch activation and bumper attachment to the exterior; Exterior plates for add-on 3-D figures, hand holds, window attachment devices and waterproof slip-on covers.

Consumers as a whole are likely to modify these covers and cases to include numerous features and elements of their own beyond the scope of the developers design. As the scope of these mobile products widens along with their many uses, the scope of these personalized and customized covers should not be determined the embodiments illustrated, but by the appended claims and their legal equivalents.

I claim:

1. A multi-panel, desktop printer customizable, flexible biodegradable composite protective cover for smartphones, phablets, tablets and flat electronic devices having one or more touchscreens, fully encompassing all surfaces of the electronic device when assembled and affixed to the electronic device, further comprising of one contiguous bio-resin composite sheet encapsulated with ink receptive art white fiber, having an internal 6 panel die-cut form with an internal spine area that joins both the back cover and the folded 4 panel pocket front cover, all 6 panels of the protective cover are symmetrically die-cut beyond the perimeter bezel shape of the electronic device providing additional protection when the cover is attached to the electronic device post print customization and assembly, the electronic device protective cover comprising:

a flat, bio-resin fiber encapsulated composite printer sheet structure between 0.25 mm and 2 mm in thickness, having 6 connected, symmetrically die-cut panels and a single spine area with all panels being die-cut, laser scored and micro-cut, placed centrically within the flat protective cover printer sheet; after printing and removing all 6 panels from the printer sheet, the outermost edge of the protective electronic front inside cover panel folds inwards towards the inside spine area at the single laser score located between the inside front cover and inside middle panel creating a roll folded pocket on the front cover with the addition of a die-cut adhesive lined 0.5 millimeter 4-panel fiber symmetrical cut form, folded in half and disposed between the inside front cover and inside middle panel; a single front cover pocket composite further comprising of 4 panels with internal fiber inserts, die-cut adhesive layers, double sided die-cut nano suction polymer pads adhered directly into the recessed adhesive lined cavities on the inside front cover pocket panel, securely locking the front cover panel to the electronic glass display side of device; and a back cover of 2 panels for mounting the inside back cover to the back or non-screen side of the electronic device form factor using a double sided, symmetrical perimeter die-cut nano suction polymer pad adhered to a permanent adhesive backed clear mount plate symmetrically die-cut to the same dimension as the inside back cover perimeter of the protective cover.

2. The protective cover of claim 1, wherein the protective cover further comprises a flat printer sheet composite structure having 22 or more ethylene-vinyl acetate resin ties layers in a thickness of 3-to-5 micrometers each, heat extruded between 20 or more layers of a modified resin blend containing poly butylene succinate adipate, modified poly butylene succinate and poly butylene adipate terephthalate plant based biodegradable resins in a thickness of 10-to-15 micrometers each, heat extruded to and encapsulated with reclaimed, opaque white, water resistant, textile cotton art fiber in a thickness of 50-to-100 micrometers for a minimal total composite printer sheet thickness of 700 micrometers.

3. The protective cover of claim 2, wherein the protective cover further comprises a printer sheet composite with resins that meet EN13432: 2000-12, ASTM D6400: 2004-01, ISO 17088(2012) standards for biodegradable resins and are certified compostable by BPI, VINCOTTE and DIN CERTCO.

4. The protective cover of claim 1, wherein the protective cover further comprises a composite printer sheet that is DIY consumer print customizable through any desktop consumer additive printer or commercial roll fed printer.

5. The protective cover of claim 2, wherein the protective cover further comprises a soft tactile art fiber surface layer encapsulating the bioresin composite that renders art quality printing on both sides of the protective cover at 5740×1440 dpi when printed with an Epson Inkjet photo printer.

6. The protective cover of claim 1, wherein the protective cover further comprises a plurality of laser ablated parallel scores through the fiber layers on both sides of the composite sheet in areas where the cover folds or flexes.

7. The protective cover of claim 1, wherein the protective cover further comprises a plurality of laser cut openings for the cameras, mics and speakers used in the electronic device on the back panel.

8. The protective cover of claim 1, wherein the protective cover further comprises a plurality of micro-cut slivers holding the die-cut cover intact throughout the print process.

9. The protective cover of claim 1, wherein the protective cover further comprises a double sided, 3 layer, flexible, washable, 1.2 millimeter thick symmetrical die-cut rubber polymer nano suction attachment pad element for affixing the back of the flat electronic device to the inside back panel of the protective cover or to other smooth surfaces for extending viewing, shooting still images and video capture.

10. The protective cover of claim 9, wherein the internal 250 micrometer clear plastic layer is fused between the rubber polymer nano suction pad layers.

11. The protective cover of claim 1, wherein the protective cover further comprises 500 micrometer thick, clear flexible bio-resin plastic peel and stick plate, lined on one side with permanent clear adhesive, die-cut to the symmetrical shape of the inside back cover perimeter and affixed to the inside printed back cover as a smooth clear mount for the reusable nano suction pad layers when affixing the electronic device to the back panel of the inside back protective cover.

12. The protective cover of claim 1, wherein the protective cover further comprises an adhesive lined, symmetrically die-cut, 500 micrometer in thickness, 4 panel fiber insert that is folded, sealed and aligned with the perimeter of the inside front cover panel creating a pocket cavity within the sealed area between the roll folded inside front cover and inside middle panel.

13. The protective cover of claim 12, wherein the folded front cover of the protective cover further comprises a plurality of die-cut, 2-sided, 1.2 millimeter thick, washable, double sided, rubber polymer nano suction buttons that are disposed into the adhesive line die-cut cavities on the inside panel of the folded front cover, securing the pocket front cover to the glass display surface of the electronic device.

* * * * *